United States Patent
Mori et al.

(10) Patent No.: US 11,412,128 B2
(45) Date of Patent: Aug. 9, 2022

(54) IMAGING DEVICE, CONTROL METHOD OF IMAGING DEVICE, AND CONTROL PROGRAM OF IMAGING DEVICE TO CHANGE ZOOM TRACKING INFORMATION BASED ON CONTRAST VALUES

(71) Applicant: FUJIFILM Corporation, Tokyo (JP)

(72) Inventors: Koji Mori, Saitama (JP); Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 210 days.

(21) Appl. No.: 16/830,044

(22) Filed: Mar. 25, 2020

(65) Prior Publication Data

US 2020/0228724 A1 Jul. 16, 2020

Related U.S. Application Data

(63) Continuation of application No. PCT/JP2018/030565, filed on Aug. 17, 2018.

(30) Foreign Application Priority Data

Sep. 28, 2017 (JP) .............................. JP2017-188602

(51) Int. Cl.
 *H04N 5/232* (2006.01)
 *G02B 7/10* (2021.01)
 *G02B 7/36* (2021.01)

(52) U.S. Cl.
 CPC ......... *H04N 5/232123* (2018.08); *G02B 7/10* (2013.01); *G02B 7/36* (2013.01); *H04N 5/23296* (2013.01)

(58) Field of Classification Search
 CPC ......... H04N 5/232123; H04N 5/23296; H04N 5/23245; H04N 5/23209; G02B 7/10;
 (Continued)

(56) References Cited

U.S. PATENT DOCUMENTS 5,055,932 A 10/1991 Hijikata
6,624,851 B1 9/2003 Okajima et al.
(Continued)

FOREIGN PATENT DOCUMENTS

CN 1940700 A 4/2007
CN 101675369 A 3/2010
(Continued)

OTHER PUBLICATIONS

Chinese Office Action and Search Report for corresponding Chinese Application No. 201880061077.6, dated Jun. 3, 2021, with English translation of the Office Action.
(Continued)

*Primary Examiner* — Gevell V Selby
(74) *Attorney, Agent, or Firm* — Birch, Stewart, Kolasch & Birch, LLP

(57) ABSTRACT

A CPU executes a zoom tracking control program to function as an acquisition unit that acquires a focal length of an imaging lens from a state of a zoom lens; and a control unit that performs first control of performing control to change a position of a focus lens along an optical axis direction according to the acquired focal length on the basis of a zoom tracking curve represented by tracking data representing a correspondence relationship between the focal length and a focus position according to a subject distance, and second control of acquiring contrast information representing contrast of a captured image a plurality of times during execution of the first control and performing control to change the zoom tracking curve used in the first control on the basis of a change of contrast values represented by a plurality of pieces of the acquired contrast information.

15 Claims, 14 Drawing Sheets

(58) Field of Classification Search
CPC .......... G02B 7/36; G02B 7/102; G02B 7/282; G02B 7/285; G02B 7/38; G02B 7/09; G03B 13/36
See application file for complete search history.

(56) References Cited

U.S. PATENT DOCUMENTS

| | | |
|---|---|---|
| 2007/0071433 A1 | 3/2007 | Kawanami |
| 2009/0244325 A1 | 10/2009 | Honjo et al. |
| 2010/0328516 A1 | 12/2010 | Yamashita et al. |
| 2011/0141340 A1 | 6/2011 | Yumiki et al. |
| 2011/0199534 A1 | 8/2011 | Kawai |
| 2012/0242886 A1 | 9/2012 | Kawarada |
| 2013/0250155 A1* | 9/2013 | Hsu .................. H04N 5/232133 348/333.01 |
| 2014/0300801 A1 | 10/2014 | Odaka et al. |
| 2014/0320736 A1* | 10/2014 | Tomita ............. H04N 5/232122 348/353 |
| 2015/0215518 A1* | 7/2015 | Nishiguchi ........ H04N 5/23296 348/240.3 |
| 2016/0094781 A1 | 3/2016 | Ebato et al. |
| 2016/0212331 A1 | 7/2016 | Kimura |
| 2016/0269617 A1* | 9/2016 | Tomita ............... H04N 5/23209 |

FOREIGN PATENT DOCUMENTS

| | | |
|---|---|---|
| CN | 101950063 A | 1/2011 |
| CN | 101971071 A | 2/2011 |
| CN | 102129146 A | 7/2011 |
| CN | 102694974 A | 9/2012 |
| CN | 104104866 A | 10/2014 |
| CN | 105264419 A | 1/2016 |
| CN | 105812653 A | 7/2016 |
| JP | 2-81012 A | 3/1990 |
| JP | 7-306631 A | 11/1995 |
| JP | 9-33792 A | 2/1997 |
| JP | 9-311265 A | 12/1997 |
| JP | 2008-129455 A | 6/2008 |
| JP | 2009-258680 A | 11/2009 |
| JP | 2013-47740 A | 3/2013 |
| WO | WO 2008/139723 A1 | 11/2008 |

OTHER PUBLICATIONS

International Preliminary Report on Patentability for PCT/JP2018/030565 (PCT/IPEA/409) dated Jun. 25, 2019.
International Search Report for PCT/JP2018/030565 dated Nov. 20, 2018.
Written Opinion of the International Searching Authority for PCT/JP2018/030565 dated Nov. 20, 2018.

* cited by examiner

IMAGING DEVICE, CONTROL METHOD OF IMAGING DEVICE, AND CONTROL PROGRAM OF IMAGING DEVICE TO CHANGE ZOOM TRACKING INFORMATION BASED ON CONTRAST VALUES

CROSS-REFERENCE TO RELATED APPLICATIONS

This application is a continuation application of International Application No. PCT/JP2018/030565, filed on Aug. 17, 2018, which is incorporated herein by reference in its entirety. Further, this application claims priority from Japanese Patent Application No. 2017-188602, filed on Sep. 28, 2017, the disclosure of which is incorporated by reference herein.

BACKGROUND

Technical Field

A technique of the present disclosure relates to an imaging device, a control method of an imaging device, and a non-transitory computer readable medium storing a control program of an imaging device.

Related Art

In the related art, an imaging device that performs a zoom tracking operation for moving a focus lens according to a zoom tracking curve representing a correspondence relationship between a focal length and a position of the focus lens, according to the drive of the zoom lens is disclosed. For example, JP2008-129455A and JP1997-311265A (JPH9-311265A) disclose a technique of performing a zoom tracking operation according to a zoom tracking curve obtained by estimation, interpolation, or the like from the zoom tracking curve that has been already obtained.

JP1997-033792A (JPH9-033792A) discloses a technique of switching a zoom tracking curve by a direction for focusing on a subject, using an output indicating that an imaging signal is detected, during the zoom tracking operation.

However, in the technique disclosed in JP1997-033792A (JPH9-033792A), even in a case where the zoom tracking operation is performed, there is a case where the deviation from the focusing position becomes large or a case where switching to an appropriate zoom tracking curve cannot be performed, and thus accuracy of the zoom tracking may be decreased. Further, in the zoom tracking operation, in a case where autofocus using a so-called contrast AF method is performed, it is necessary to move the focus lens to a position far from the focusing position once in order to derive an accurate focusing position, and in this case, since the captured image becomes blurred once, appearance of the captured image may deteriorate.

SUMMARY

The present disclosure provides an imaging device, a control method of an imaging device, and a non-transitory computer readable medium storing a control program of an imaging device which can improve accuracy of zoom tracking while suppressing deterioration of appearance of a captured image.

A first aspect of the present disclosure is an imaging device comprising an imaging lens having an imaging optical system including a zoom lens and a focus lens; an imaging unit that includes an imager, and outputs an image signal obtained by imaging a subject through the imaging optical system by the imager; an image generation unit that generates a captured image according to the image signal; an acquisition unit that acquires a focal length of the imaging lens from a state of the zoom lens; and a control unit that performs first control of performing control to change a position of the focus lens along an optical axis direction according to the focal length acquired by the acquisition unit on the basis of zoom tracking information representing a correspondence relationship between the focal length and a focus position according to a subject distance, and second control of acquiring contrast information representing contrast of the captured image a plurality of times during execution of the first control and performing control to change the zoom tracking information used in the first control on the basis of a change of contrast values represented by a plurality of pieces of the acquired contrast information.

In a second aspect of the present disclosure, in the first aspect, the zoom tracking information is a zoom tracking curve representing the correspondence relationship between the focal length and the focus position.

In a third aspect of the present disclosure, in the second aspect, the second control is control to change the zoom tracking curve used in the first control to a zoom tracking curve on a front side which is shifted by a depth of field or a zoom tracking curve on a rear side which is shifted by the depth of field.

In a fourth aspect of the present disclosure, in the second aspect, in a case where the contrast values represented by the plurality of pieces of contrast information include a peak value of the contrast value, the second control is control to change the zoom tracking curve to a zoom tracking curve according to the peak value.

In a fifth aspect of the present disclosure, in the third or fourth aspect, in a case where a contrast curve represented by the contrast values represented by the plurality of pieces of contrast information shows an increasing tendency, the second control is control to change the zoom tracking curve to the zoom tracking curve on the front side which is shifted by the depth of field.

In a sixth aspect of the present disclosure, in any one of the third to fifth aspects, in a case where a contrast curve represented by the contrast values represented by the plurality of pieces of contrast information shows a decreasing tendency, the second control is control to change the zoom tracking curve to the zoom tracking curve on the rear side which is shifted by the depth of field.

In a seventh aspect of the present disclosure, in the second aspect, the second control is control to change the zoom tracking curve used in the first control to another zoom tracking curve which is in a predetermined range from the zoom tracking curve before change.

In an eighth aspect of the present disclosure, in the seventh aspect, the predetermined range is a range according to a depth of field according to the zoom tracking curve before change.

In a ninth aspect of the present disclosure, in any one of the second to eighth aspects, in a case where a change speed of the position of the focus lens which is changed in the first control is lower than a predetermined speed, the control unit prohibits execution of the second control.

In a tenth aspect of the present disclosure, in the ninth aspect, the predetermined speed is a speed at which the change of the position of the focus lens is not able to follow the zoom tracking curve.

In an eleventh aspect of the present disclosure, in any one of the first to tenth aspects, in a case where a change speed at which the focal length acquired by the acquisition unit is changed is less than a predetermined change speed, the control unit performs the second control.

In a twelfth aspect of the present disclosure, in any one of the first to eleventh aspects, in a case where a difference between the contrast value represented by the contrast information before execution of the first control and the contrast value represented by the contrast information after execution of the first control is equal to or greater than a predetermined threshold value, the control unit prohibits execution of the second control.

In a thirteenth aspect of the present disclosure, in any one of the first to twelfth aspects, the control unit further performs control to increase a frame rate at which the image signal is output to the imaging unit during an operation of acquiring the contrast information, as compare with other cases.

In a fourteenth aspect of the present disclosure, in any one of the first to thirteenth aspects, the control unit performs the second control in a case where the focal length is changed from a wide angle side to a telephoto side by the movement of the zoom lens, and prohibits the second control in a case where the focal length is changed from the telephoto side to the wide angle side.

A fifteenth aspect of the present disclosure is a control method of an imaging device comprising an imaging lens having an imaging optical system including a zoom lens and a focus lens, an imaging unit that includes an imager and outputs an image signal obtained by imaging a subject through the imaging optical system by the imager, an image generation unit that generates a captured image according to the image signal, and an acquisition unit that acquires a focal length of the imaging lens from a state of the zoom lens, the control method comprising: performing first control to change a position of the focus lens along an optical axis direction according to the focal length acquired by the acquisition unit on the basis of zoom tracking information representing a correspondence relationship between the focal length and a focus position according to a subject distance; and performing second control to acquire contrast information representing contrast of the captured image a plurality of times during execution of the first control and to change the zoom tracking information used in the first control on the basis of a change of contrast values represented by a plurality of pieces of the acquired contrast information.

A sixteenth aspect of the present disclosure is a non-transitory computer readable medium storing a control program of an imaging device comprising an imaging lens having an imaging optical system including a zoom lens and a focus lens, an imaging unit that includes an imager and outputs an image signal obtained by imaging a subject through the imaging optical system by the imager, an image generation unit that generates a captured image according to the image signal, and an acquisition unit that acquires a focal length of the imaging lens from a state of the zoom lens, the control program causing a computer to execute a process comprising: performing first control to change a position of the focus lens along an optical axis direction according to the focal length acquired by the acquisition unit on the basis of zoom tracking information representing a correspondence relationship between the focal length and a focus position according to a subject distance; and performing second control to acquire contrast information representing contrast of the captured image a plurality of times during execution of the first control and to change the zoom tracking information used in the first control on the basis of a change of contrast values represented by a plurality of pieces of the acquired contrast information.

According to the above-described aspects of the present disclosure, an imaging device, a control method of an imaging device, and a non-transitory computer readable medium storing a control program of an imaging device which can improve accuracy of zoom tracking while suppressing deterioration of appearance of a captured image are provided.

DESCRIPTION OF EMBODIMENTS

Hereinafter, embodiments for implementing the technique of the present disclosure will be described in detail with reference to the drawings.

First Exemplary Embodiment

Figure 1:
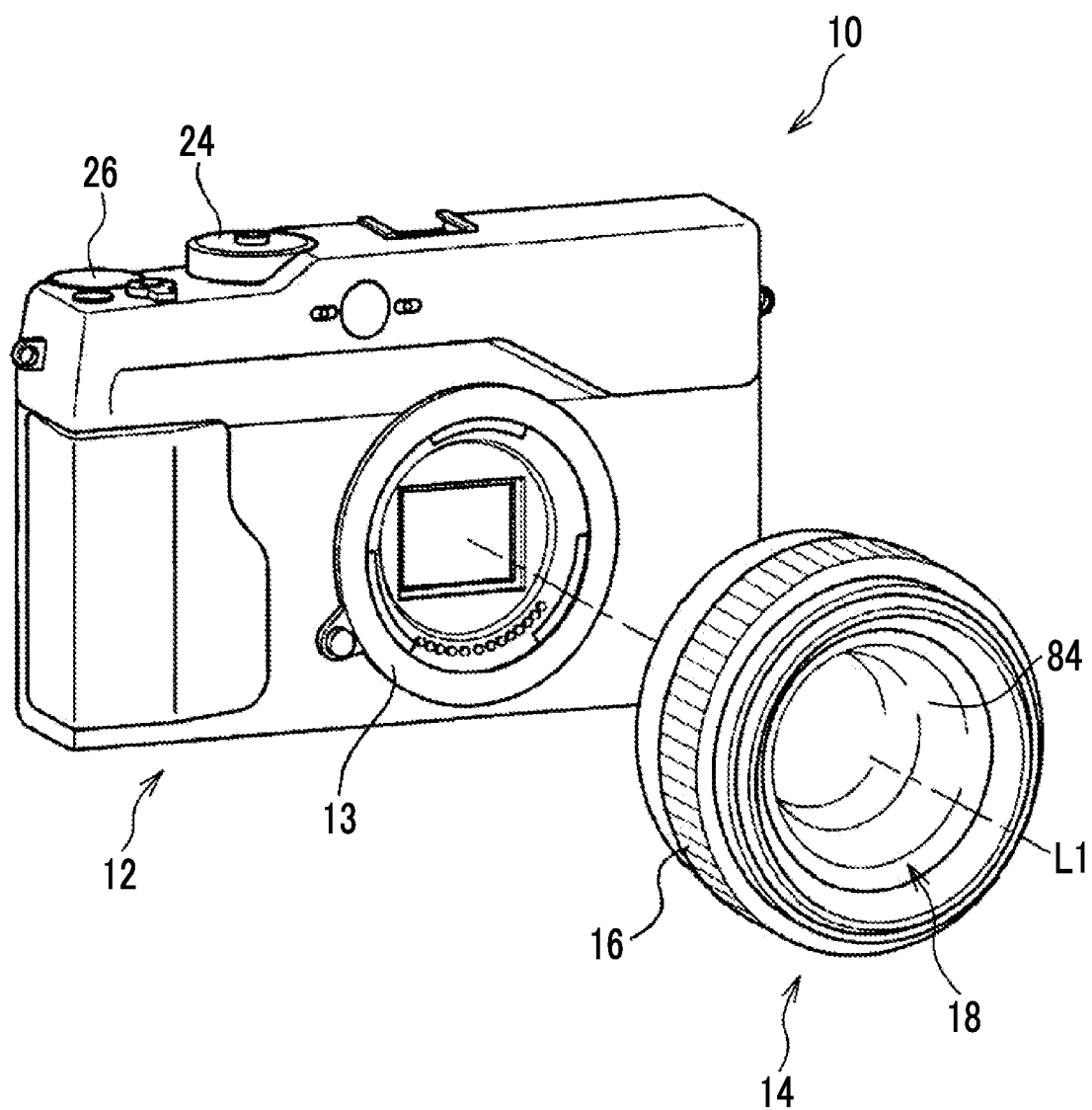
FIG. 1 is a perspective view showing an example of appearance of an imaging device according to first and second exemplary embodiments.

First, an example of the configuration of an imaging device 10 according to the exemplary embodiment will be described with reference to FIGS. 1 to 3. As shown in FIG. 1, for example, the imaging device 10 of the exemplary embodiment is a lens-interchangeable digital camera, and includes an imaging device body 12 and an imaging lens 14.

The imaging lens 14 is mounted on the imaging device body 12 to be interchangeable. A lens barrel of the imaging lens 14 is provided with a focus ring 16 that is used in a manual focus mode. The imaging lens 14 includes a lens unit 18. The lens unit 18 according to the exemplary embodiment is an example of an imaging optical system of the present disclosure.

The lens unit 18 is a combination lens where a plurality of lenses including a focus lens 84 are combined. The focus lens 84 is moved in a direction of an optical axis L1 with an operation for manually rotating the focus ring 16, and subject light, which is reflected light representing a subject, forms an image on a light-receiving surface 22A (refer to FIG. 3) of an imaging element 22, which will be described below, at a focusing position corresponding to a subject distance. The "subject distance" is a distance from the light-receiving surface 22A to the subject.

A dial 24 and a release button 26 are provided on the upper surface of the imaging device body 12. The dial 24 is operated in a case where various kinds of setting, such as switching between an imaging mode and a playback mode, are to be performed. Accordingly, in the imaging device 10, the dial 24 is operated by a user so that the imaging mode and the playback mode are selectively set as an operating mode.

The imaging device 10 has a static image capturing mode and a video capturing mode as operating modes of an imaging system. The static image capturing mode is an operating mode of recording a static image obtained by the imaging device 10 imaging a subject, and the video capturing mode is an operating mode of recording a video obtained by the imaging device 10 imaging a subject. In the exemplary embodiment, in a case where the static image and the video are collectively referred without being distinguished, the static image and the video are simply referred to as the "captured image".

The release button 26 is adapted so that two-stage pressing operations of an imaging-preparation instruction state and an imaging instruction state can be detected. The imaging-preparation instruction state refers to, for example, a state where the release button is pressed down to an intermediate position (half-pressed position) from a stand-by position, and the imaging instruction state refers to a state where the release button is pressed down to a final pressed-down position (fully-pressed position) over the intermediate position. In the following description, the "state where the release button is pressed down to the half-pressed position from the stand-by position" is referred to as a "half-pressed state" and the "state where the release button is pressed down to the fully-pressed position from the stand-by position" is referred to as a "fully-pressed state".

In the autofocus mode, the release button 26 is made to be in the half-pressed state to adjust imaging conditions and is then made to be in the fully-pressed state to perform main exposure. That is, after an auto exposure (AE) function works to set an exposure amount state by making the release button 26 to be in the half-pressed state, an auto focus (AF) function works to perform focusing control, and imaging is performed in a case where the release button 26 is made to be in the fully-pressed state.

Figure 2:
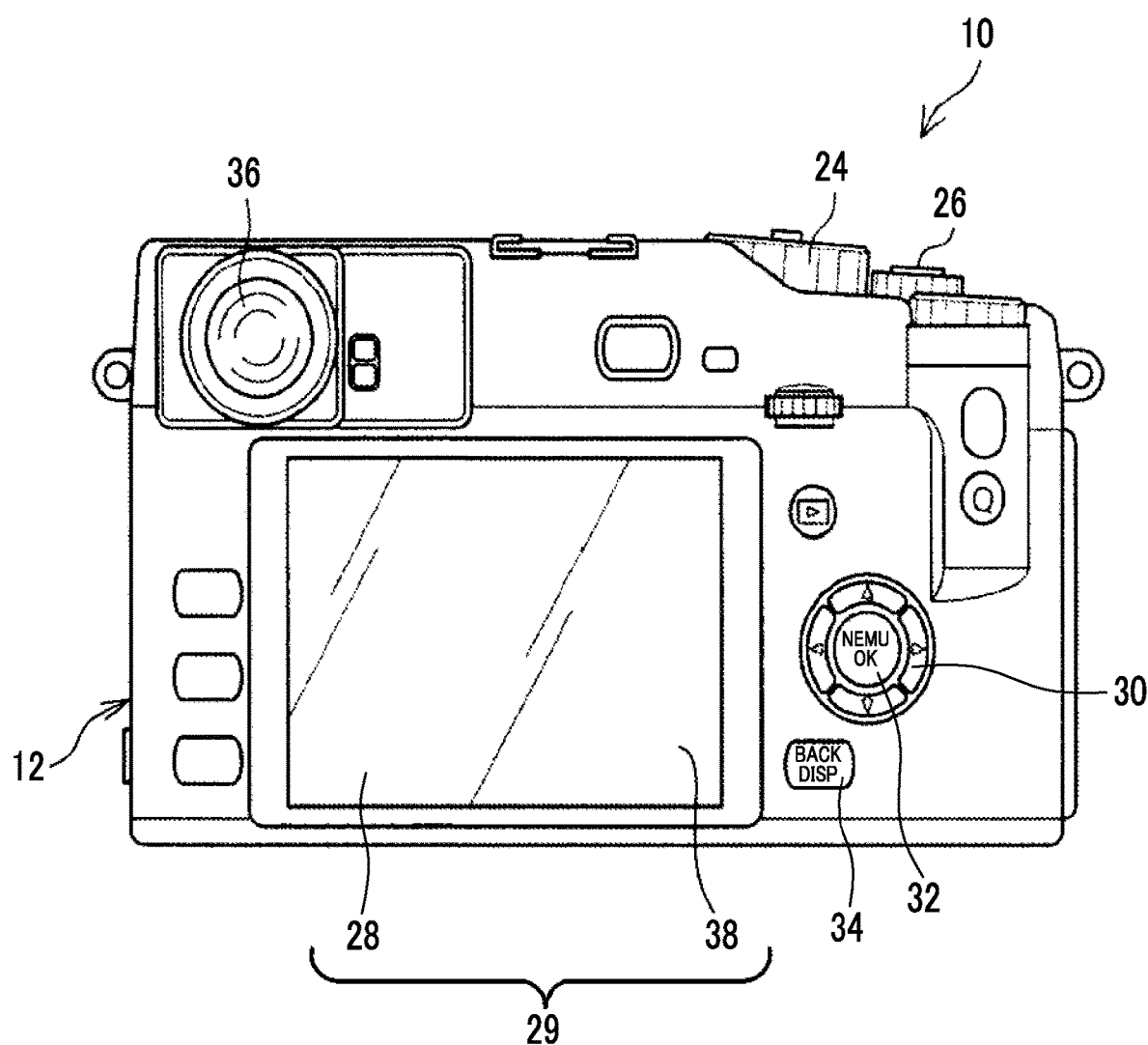
FIG. 2 is a rear view showing an example of appearance on the rear surface side of the imaging device according to the first and second exemplary embodiments.

As shown in FIG. 2, for example, a display 28, a cross key 30, a MENU/OK key 32, a BACK/DISP button 34, a finder 36, and a touch panel 38 are provided on the rear surface of the imaging device body 12.

The display 28 is, for example, a liquid crystal display (LCD), and displays an image obtained by the imaging device 10 imaging a subject, characters, and the like. The display 28 of the exemplary embodiment is an example of a display unit of the present disclosure. The display 28 of the exemplary embodiment is configured as a touch panel display 29 together with the touch panel 38. The display 28 is used for the display of a live view image in the imaging mode. The live view image is also referred to as a through image, and is a continuous frame image that is obtained from the imaging of a subject with continuous frames by the imaging element 22 of the imaging device 10. The term "captured image" also includes the live view image.

The display 28 is also used for the display of a static image that is obtained from imaging with a single frame in a case where an instruction to capture a static image is given. Further, the display 28 is also used for the display of a playback image in the playback mode and the display of a menu screen, and the like.

A transmission-type touch panel 38 is superimposed on the front surface of a display area of the display 28. The touch panel 38 detects the contact by a pointer body such as a finger or a stylus pen. The touch panel 38 outputs detection result information representing the detection result of the presence or absence of the contact by the pointer body with respect to the touch panel 38, to a predetermined output destination (for example, a central processing unit (CPU) 74 (refer to FIG. 3) which will be described below) at a predetermined cycle (for example, 100 milliseconds). The detection result information includes two-dimensional coordinates (hereinafter, referred to as "coordinates") that can specify a contact position on the touch panel 38 where the pointer body comes into contact with the touch panel 38 in a case where the touch panel 38 detects the contact by the pointer body, and does not include the coordinates in a case where the touch panel 38 does not detect the contact by the pointer body.

The cross key 30 functions as a multifunction key that outputs instruction content signals according to various instructions such as the selection of one or a plurality of menus, zoom, frame advance, and the like. The MENU/OK key 32 is an operation key having both a function as a menu (MENU) button for giving an instruction to display one or a plurality of menus on the screen of the display 28 and a function as a permission (OK) button for giving an instruction to confirm and execute the selected contents and the like. The BACK/DISP button 34 is used for the deletion of a desired object such as a selected item, the cancellation of designated contents, the return of an operation state to a previous operation state, or the like.

Figure 3:
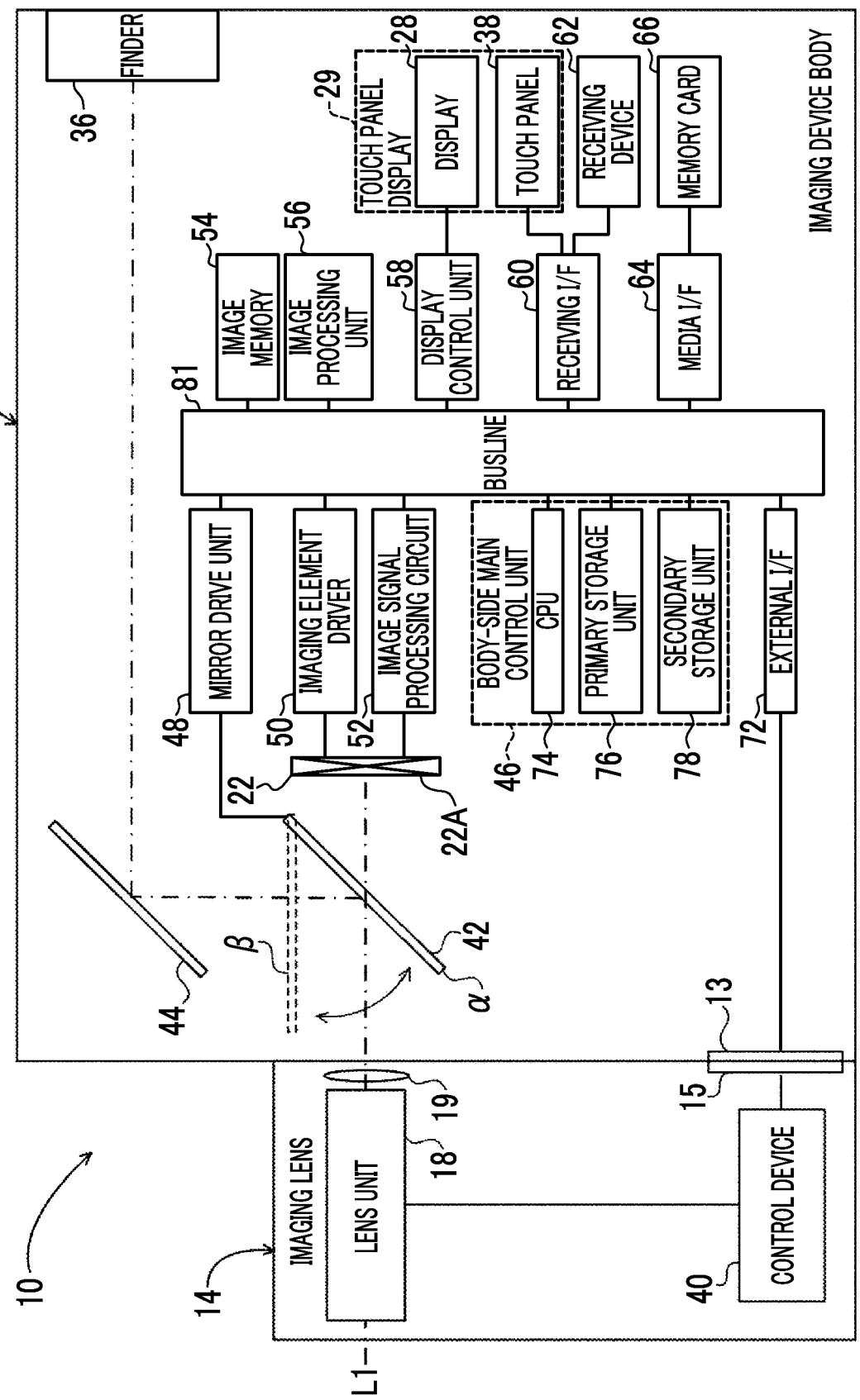
FIG. 3 is a block diagram showing an example of the hardware configuration of the imaging device according to the first and second exemplary embodiments.

FIG. 3 is a block diagram showing an example of the hardware configuration of the imaging device 10 according to the exemplary embodiment. Further, FIG. 4 is a block diagram showing an example of the hardware configuration of the imaging lens 14 included in the imaging device 10 according to the exemplary embodiment.

As shown in FIG. 3, the imaging device body 12 of the exemplary embodiment comprises a mount 13 (refer to also FIG. 1), and the imaging lens 14 comprises a mount 15. The mount 15 is joined to the mount 13 so that the imaging lens 14 is mounted on the imaging device body 12 to be interchangeable.

The imaging lens 14 includes the above-described lens unit 18, a stop 19, and a control device 40. The mount 15 is connected to the mount 13 so that the control device 40 is electrically connected to the CPU 74 via an external interface (I/F) 72 of the imaging device body 12, and the control device 40 controls the entire imaging lens 14 according to an instruction of the CPU 74.

Figure 4:
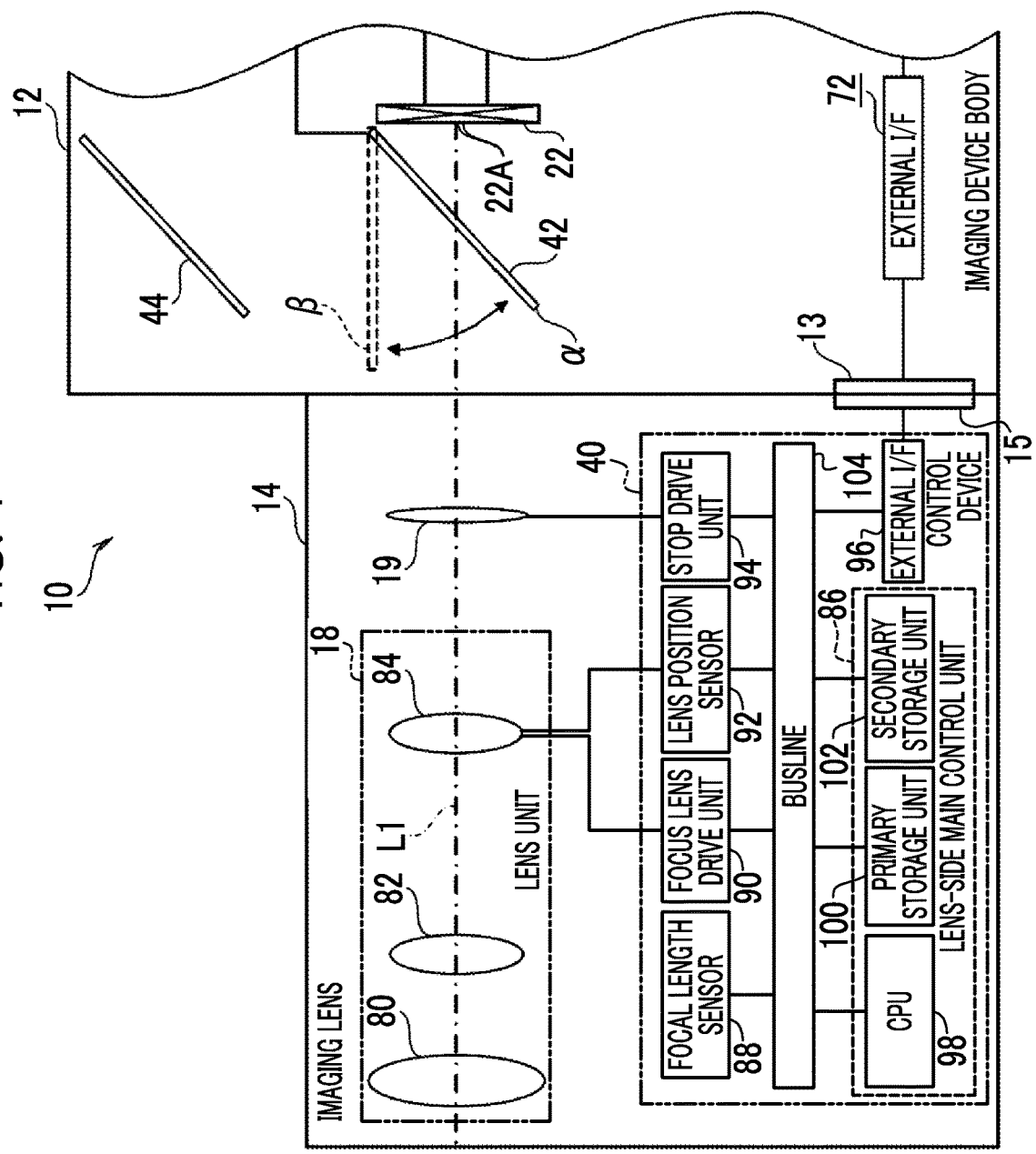
FIG. 4 is a block diagram showing an example of the hardware configuration of an imaging lens included in the imaging device according to the first and second exemplary embodiments.

As shown in FIG. 4, the lens unit 18 of the exemplary embodiment includes an incident lens 80, a zoom lens 82, and the above-described focus lens 84. The incident lens 80, the zoom lens 82, and the focus lens 84 are arranged along the optical axis L1; and the focus lens 84, the zoom lens 82, and the incident lens 80 are arranged along the optical axis L1 in this order from the stop 19 side.

Subject light is incident on the incident lens 80. The incident lens 80 transmits the subject light and guides the subject light to the zoom lens 82. The zoom lens 82 of the exemplary embodiment includes a plurality of lenses that are movable along the optical axis L1, and the focal length of the imaging lens 14 (hereinafter, simply referred to as a "focal length") is adjusted by adjusting the state of the zoom lens 82. Specifically, in the zoom lens 82, a zoom ring (not shown) provided in the imaging lens 14 is rotated to cause respective lenses to be close to each other or to be far from each other along the optical axis L1 so that the positional relationship of the lenses along the optical axis L1 is adjusted, and thereby the focal length is adjusted. The zoom lens 82 transmits the subject light, which is incident from the incident lens 80, and guides the subject light to the focus lens 84.

The focus lens 84 is a lens movable along the optical axis L1, and is moved along the optical axis L1 to change the focus state of a subject image that is formed on the light-receiving surface 22A of the imaging element 22. The focus lens 84 transmits the subject light, which is incident from the zoom lens 82, and guides the subject light to the stop 19. The stop 19 adjusts an amount of subject light transmitted through the lens unit 18, and guides the subject light into the imaging device body 12.

The control device 40 of the imaging lens 14 includes a lens-side main control unit 86, a focal length sensor 88, a focus lens drive unit 90, a lens position sensor 92, a stop drive unit 94, and an external I/F 96.

The lens-side main control unit 86 comprises a CPU 98, a primary storage unit 100, and a secondary storage unit 102. The CPU 98 controls the entire imaging lens 14. The primary storage unit 100 is a volatile memory that is used as a work area and the like at the time of execution of various programs. Examples of the primary storage unit 100 include a random access memory (RAM). The secondary storage unit 102 is a non-volatile memory that stores various programs, various parameters, and the like in advance. Examples of the secondary storage unit 102 include an electrically erasable programmable read-only memory (EEPROM) or a flash memory.

The CPU 98, the primary storage unit 100, and the secondary storage unit 102 are connected to a busline 104. Further, the focal length sensor 88, the focus lens drive unit 90, the lens position sensor 92, the stop drive unit 94, and the external I/F 96 are also connected to the busline 104.

The mount 15 is connected to the mount 13 so that the external I/F 96 is connected to the external I/F 72 of the imaging device body 12, and the external I/F 96 takes charge of transmission and reception of various kinds of information between the CPU 98 and the CPU 74 of the imaging device body 12 in cooperation with the external I/F 72.

The focal length sensor 88 detects the state of the zoom lens 82 from the rotation state of the focus ring 16, and converts the detected state of the zoom lens 82 into the focal length. Then, the focal length sensor 88 outputs focal length information representing the focal length obtained by the conversion, to the CPU 98.

The focus lens drive unit 90 includes a focus lens-driving motor (not shown). The focus lens drive unit 90 moves the focus lens 84 along the optical axis L1 by operating the focus lens-driving motor according to driving pulses under the control of the CPU 98 according to an instruction that is received by a receiving device 62. That is, the focus lens drive unit 90 moves the focus lens 84 along the optical axis L1 by operating the focus lens-driving motor according to an instruction from the CPU 98 and transmitting the power of the focus lens-driving motor to the focus lens 84. The lens position sensor 92 detects the position of the focus lens 84 along the optical axis L1, and outputs lens position information representing the detected position, to the CPU 98.

Figure 5:
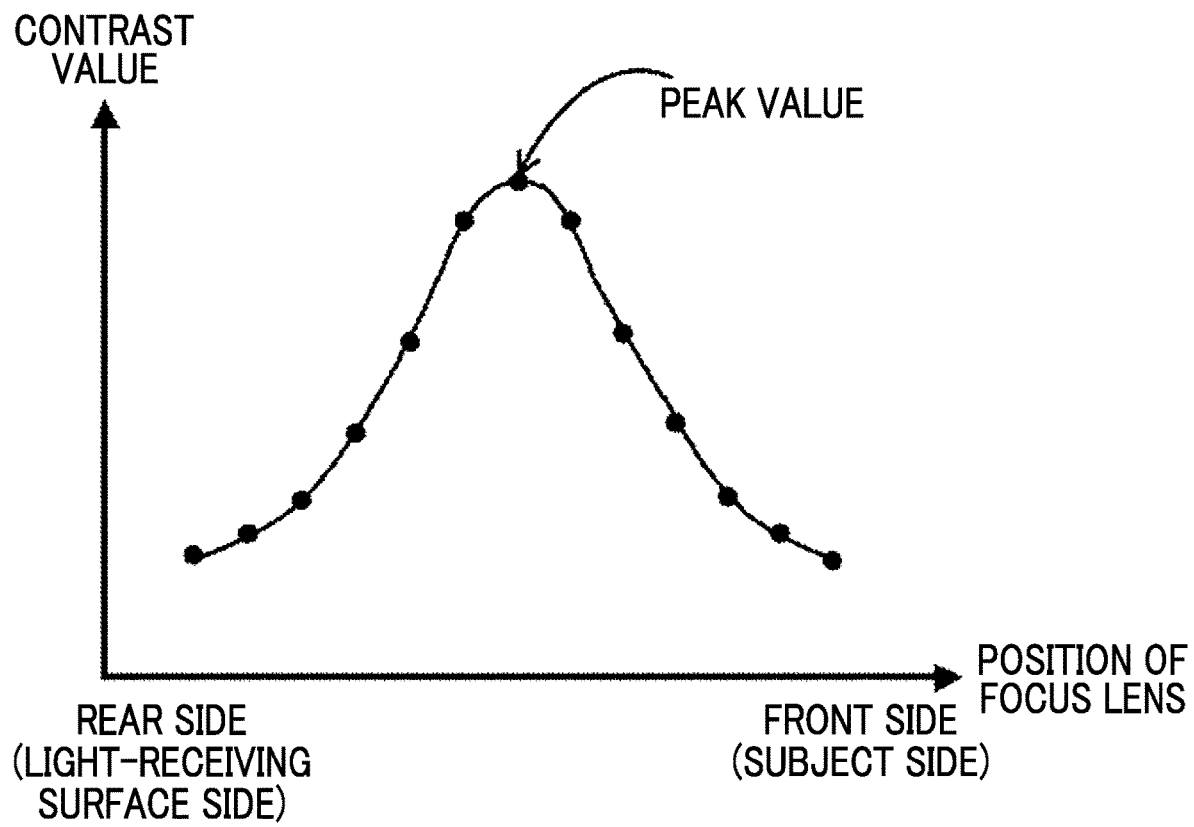
FIG. 5 is a graph for describing autofocus according to the first and second exemplary embodiments.

The stop drive unit 94 includes a stop-driving motor (not shown). The stop drive unit 94 adjusts the size of the aperture of the stop 19 by operating the stop-driving motor under the control of the CPU 98 according to an instruction that is received by the receiving device 62. The imaging device 10 of the exemplary embodiment performs autofocus using a so-called contrast AF method. Specifically, the imaging device 10 of the exemplary embodiment derives contrast values for the autofocus at a plurality of different positions while moving the focus lens 84 from a rear side (light-receiving surface side) to a front side (subject side) along the optical axis L1 as shown in FIG. 5, for example. Then, the imaging device 10 performs focusing control by moving the focus lens 84 to a position where the derived contrast value is the peak value. For example, in the exemplary embodiment, as the contrast value, a contrast value of an autofocus area is applied.

Figure 6:
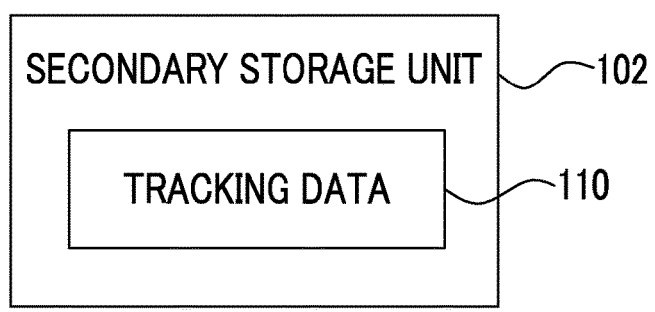
FIG. 6 is a conceptual diagram showing an example of contents stored in a secondary storage unit of a lens-side main control unit included in the imaging lens of the imaging device according to the first and second exemplary embodiments.

As shown in FIG. 6, for example, the secondary storage unit 102 of the lens-side main control unit 86 stores tracking data 110. The tracking data 110 is data used in the zoom tracking operation for changing the position of the focus lens 84 along the optical axis L1 according to the focal length. The tracking data 110 of the exemplary embodiment is an example of zoom tracking information of the present disclosure.

Figure 7:
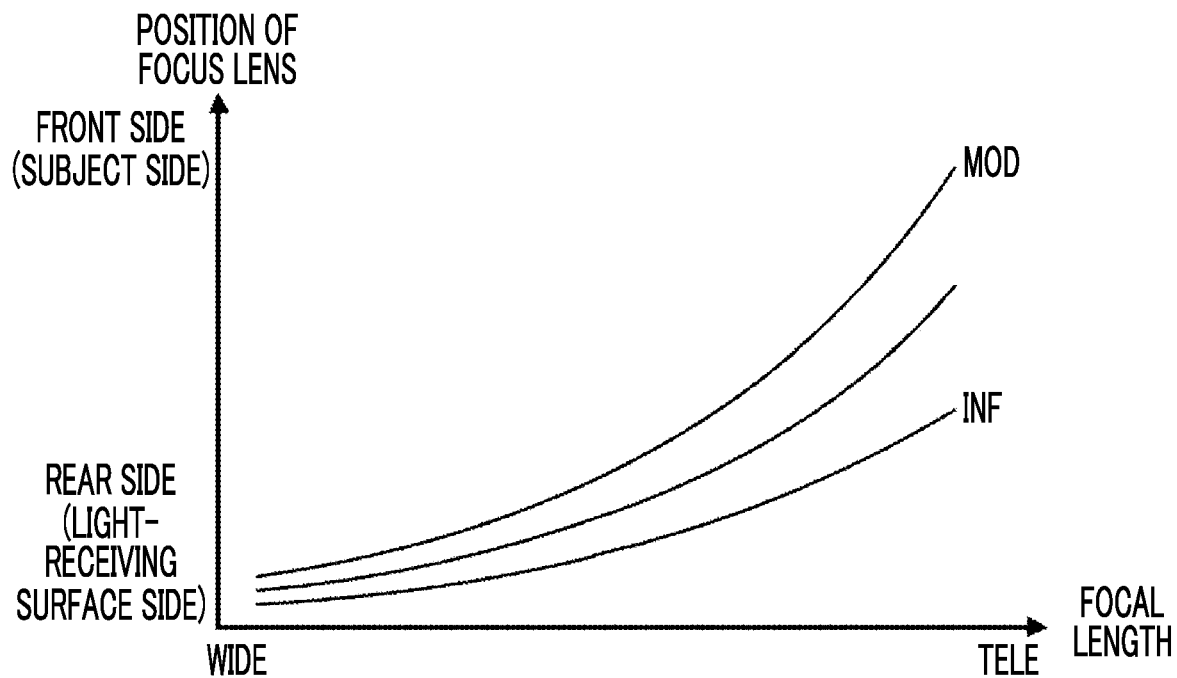
FIG. 7 is a graph for describing tracking data according to the first and second exemplary embodiments.

As shown in FIG. 7, for example, the tracking data 110 of the exemplary embodiment includes data representing a correspondence relationship between the position of the focus lens 84 along the optical axis L1 and the focal length in a case where the subject distance is infinity (INF). Further, the tracking data 110 includes data representing a correspondence relationship between the position of the focus lens 84 along the optical axis L1 and the focal length in a case where the subject distance is the minimum object distance (MOD). Hereinafter, in case of simply describing the position of the focus lens 84, it represents the position of the focus lens 84 along the optical axis L1.

The tracking data 110 may be data in which combinations of the position of the focus lens 84 and the focal length representing the zoom tracking curve are stored for each of the zoom tracking curves corresponding to a plurality of types of subject distances assumed in advance, including infinity and the minimum object distance, in a table format, or may be data expressed in a format of a function using the depth of field and the focal length as parameters. In the imaging device 10 of the exemplary embodiment, even the zoom tracking curve which is not included in the tracking data 110 can be derived by interpolating the zoom tracking curves included in the tracking data 110 by using a known method.

On the other hand, as shown in FIG. 3, the imaging device body 12 of the exemplary embodiment includes the imaging element 22, a first mirror 42, a second mirror 44, a body-side main control unit 46, a mirror drive unit 48, an imaging element driver 50, an image signal processing circuit 52, an image memory 54, an image processing unit 56, and a display control unit 58. Further, the imaging device body 12 includes a receiving I/F 60, the receiving device 62, a media I/F 64, and the external I/F 72.

Figure 8:
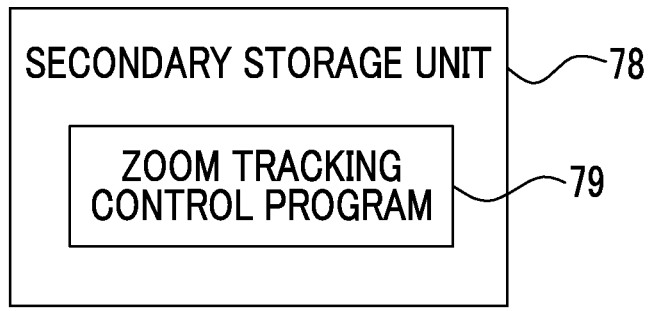
FIG. 8 is a conceptual diagram showing an example of contents stored in a secondary storage unit of a body-side main control unit included in an imaging device body according to the first and second exemplary embodiments.

The body-side main control unit 46 is an example of a computer of the technique of the present disclosure, and comprises the CPU 74, a primary storage unit 76, and a secondary storage unit 78. The CPU 74 controls the entire imaging device 10. The primary storage unit 76 is a volatile memory that is used as a work area and the like at the time of execution of various programs. Examples of the primary storage unit 76 include a RAM. The secondary storage unit 78 of the exemplary embodiment is a non-volatile memory that stores various programs including a zoom tracking control program 79 as shown in FIG. 8, various parameters, and the like in advance. Examples of the secondary storage unit 78 include an EEPROM, a flash memory, and the like.

The CPU 74 reads the zoom tracking control program 79 from the secondary storage unit 78, develops the zoom tracking control program 79 in the primary storage unit 76, and executes zoom tracking control processing, which will be described below in detail, according to the developed zoom tracking control program 79. In other words, the CPU 74 operates as an acquisition unit and a control unit of the technique of the present disclosure by executing the zoom tracking control program 79. The zoom tracking control program 79 of the exemplary embodiment is an example of a control program of the present disclosure.

The CPU 74, the primary storage unit 76, and the secondary storage unit 78 are connected to a busline 81. Further, the mirror drive unit 48, the imaging element driver 50, and the image signal processing circuit 52 are also connected to the busline 81. Furthermore, the image memory 54, the image processing unit 56, the display control unit 58, the receiving I/F 60, the media I/F 64, and the external I/F 72 are also connected to the busline 81.

The first mirror 42 is a movable mirror that is interposed between the light-receiving surface 22A of the imaging element 22 and the lens unit 18 and is movable between a light-receiving surface covering position α and a light-receiving surface opening position β. The first mirror 42 is connected to the mirror drive unit 48, and the mirror drive unit 48 drives the first mirror 42 under the control of the CPU 74 to selectively dispose the first mirror 42 at the light-receiving surface covering position α and the light-receiving surface opening position β. That is, the first mirror 42 is disposed at the light-receiving surface covering position α by the mirror drive unit 48 in a case where subject light is not to be received by the light-receiving surface 22A, and the first mirror 42 is disposed at the light-receiving surface opening position β by the mirror drive unit 48 in a case where subject light is to be received by the light-receiving surface 22A.

At the light-receiving surface covering position α, the first mirror 42 covers the light-receiving surface 22A and reflects the subject light sent from the lens unit 18, to guide the subject light to the second mirror 44. The second mirror 44 reflects the subject light, which is guided from the first mirror 42, to guide the subject light to the finder 36 through the optical system (not shown). The finder 36 transmits the subject light that is guided by the second mirror 44.

On the other hand, at the light-receiving surface opening position β, a state where the light-receiving surface 22A is covered with the first mirror 42 is released, and subject light is received by the light-receiving surface 22A without being reflected by the first mirror 42.

The imaging element driver 50 is connected to the imaging element 22. In the exemplary embodiment, a charge coupled device (CCD) image sensor is used as the imaging element 22, but the technique of the present disclosure is not limited thereto and other image sensors such as a complementary metal-oxide-semiconductor (CMOS) image sensor may be used.

The image signal processing circuit 52 reads, for each pixel, image signals corresponding to one frame from the imaging element 22 according to horizontal synchronization signals. The image signal processing circuit 52 performs various kinds of processing, such as correlative double sampling processing, automatic gain control, and analog/digital (A/D) conversion, on the read image signals. The image signal processing circuit 52 outputs digitized image signals, which are obtained by performing various kinds of processing on the image signals, to the image memory 54 for each frame at a specific frame rate (for example, several tens of frames/second) that is defined by a clock signal supplied from the CPU 74.

The imaging element 22 and the imaging element driver 50 of the exemplary embodiment are examples of an imaging unit of the present disclosure.

The image memory 54 temporarily holds the image signals that are input from the image signal processing circuit 52.

The image processing unit 56 acquires image signals from the image memory 54 for each frame at a specific frame rate, and performs various kinds of processing, such as gamma correction, brightness conversion, color difference conversion, and compression processing, on the acquired image signals. In addition, the image processing unit 56 outputs the image signals, which are obtained through the various kinds of processing, to the display control unit 58 for each frame at a specific frame rate. Further, the image processing unit 56 outputs the image signals, which are obtained through the various kinds of processing, to the CPU 74 in response to the request of the CPU 74. The image processing unit 56 of the exemplary embodiment is an example of an image generation unit of the present disclosure.

The display control unit 58 is connected to the display 28 of the touch panel display 29, and controls the display 28 under the control of the CPU 74. Further, the display control unit 58 outputs the image signals, which are input from the image processing unit 56, to the display 28 for each frame at a specific frame rate.

The display 28 displays an image represented by the image signals which are input at a specific frame rate from the display control unit 58, as a live view image. Further, the display 28 also displays a static image that is a single frame image obtained through imaging with a single frame. A playback image, a menu screen, and the like are displayed on the display 28 in addition to the live view image.

The receiving device 62 includes the dial 24, the release button 26, the cross key 30, the MENU/OK key 32, the BACK/DISP button 34, and the like, and receives various instructions from a user. The receiving device 62 of the exemplary embodiment is an example of a reception unit of the present disclosure.

The touch panel 38 of the touch panel display 29 and the receiving device 62 are connected to the receiving I/F 60, and output an instruction content signal representing the contents of the received instruction, to the receiving I/F 60. The receiving I/F 60 outputs the input instruction content signal to the CPU 74. The CPU 74 executes processing corresponding to the instruction content signals that are input from the receiving I/F 60.

A memory card 66 is connected to the media I/F 64 in a detachable manner. The media I/F 64 performs recording and reading of an image file with respect to the memory card 66 under the control of the CPU 74.

Under the control of the CPU 74, the image file that is read from the memory card 66 by the media I/F 64 is subjected to decompression processing by the image processing unit 56 to be displayed on the display 28 as the playback image.

The operating mode is switched in the imaging device 10 according to an instruction that is received by the receiving device 62. For example, the static image capturing mode and the video capturing mode are selectively set in the imaging device 10 under the imaging mode according to an instruction that is received by the receiving device 62. A static image file can be recorded in the memory card 66 under the static image capturing mode, and a video file can be recorded in the memory card 66 under the video capturing mode.

In a case where an instruction to capture a static image is received by the release button 26 under the static image capturing mode, the CPU 74 controls the imaging element driver 50 to cause the imaging element 22 to perform main exposure corresponding to one frame. The image processing unit 56 acquires image signals, which are obtained from the exposure corresponding to one frame, under the control of the CPU 74, and performs compression processing on the acquired image signals to generate a static image file in a specific static image format. The specific static image format may be, for example, a Joint Photographic Experts Group (JPEG) format. The static image file is recorded in the memory card 66 via the media I/F 64 by the image processing unit 56 under the control of the CPU 74.

In a case where an instruction to capture a video is received by the release button 26 under the video capturing mode, the image processing unit 56 performs compression processing on image signals for a live view image to generate a video file in a specific video format. The specific video format may be, for example, a Moving Picture Experts Group (MPEG) format. The video file is recorded in the memory card 66 via the media I/F 64 by the image processing unit 56 under the control of the CPU 74.

Next, as the operation of the imaging device 10 of the exemplary embodiment, the operation of the imaging device 10 in case of performing zoom tracking control processing of the exemplary embodiment will be described.

Figure 9:
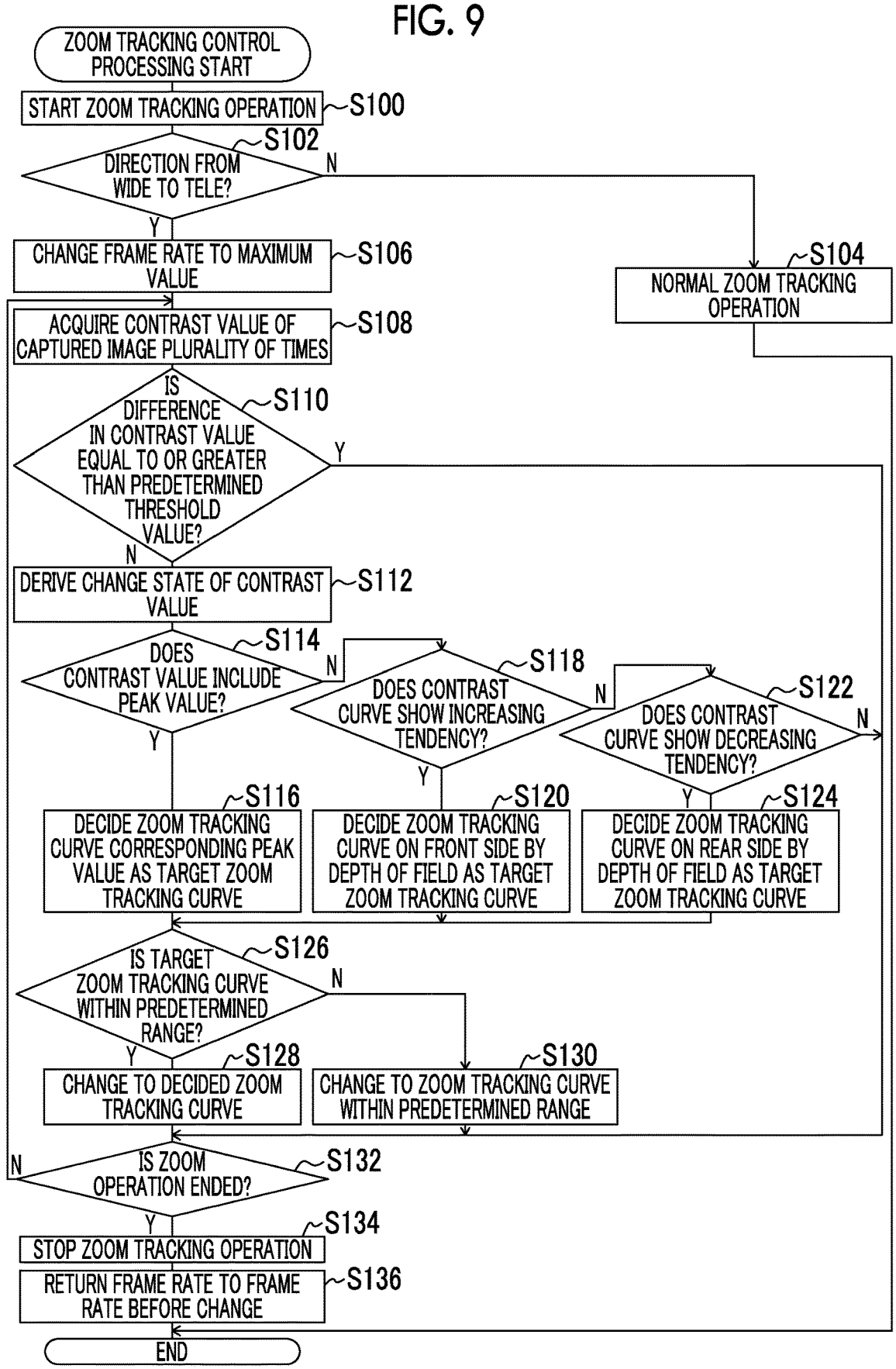
FIG. 9 is a flowchart showing an example of the flow of zoom tracking control processing according to the first exemplary embodiment.

In the exemplary embodiment, in a case where the movement of the zoom lens 82 is started after transition to the imaging mode, the CPU 74 of the imaging device 10 reads the zoom tracking control program 79 from the secondary storage unit 78, develops and executes the zoom tracking control program 79 in the primary storage unit 76 so that the zoom tracking control processing, for example, shown in FIG. 9 is executed.

In step S100 of FIG. 9, the CPU 74 starts the zoom tracking operation. Specifically, the CPU 74 reads the tracking data 110 according to the current subject distance from the secondary storage unit 102. Further, the CPU 74 starts the zoom tracking operation for causing the focus lens drive unit 90 to move the focus lens 84 according to the movement of the zoom lens 82 on the basis of the zoom tracking curve that the read tracking data 110 represents. The CPU 74 of the exemplary embodiment acquires the contrast value of the captured image before the start of the zoom tracking operation.

In step S102, the CPU 74 determines whether the zoom lens 82 is being moved in a direction in which the focal length is changed from the WIDE to the TELE on the basis of the focal length information output from the focal length sensor 88.

In the imaging device 10 of the exemplary embodiment, since the resolution of the driving pulses for operating the focus lens-driving motor is low at a position where the focal length is on the most WIDE side, variation in the position of the focus lens 84 causes a limit in measurement accuracy.

The upper limit and the lower limit of the variation in the position of the focus lens 84 are decided on the basis of the focal depth (depth of field) at the position where the focal length is on the most WIDE side. In case shown in FIG. 10, a zoom tracking curve U is the upper limit, a zoom tracking curve L is the lower limit, and the range between the zoom tracking curve U and the zoom tracking curve L is an allowable range of blurriness occurring in the captured image.

In a case where the zoom tracking operation is performed according to a zoom tracking curve T, for the zoom tracking curve T, when the zoom tracking operation is performed within a range between a zoom tracking curve T1 according to the depth of field on the front side (subject side) and a zoom tracking curve T2 according to the depth of field on the rear side (light-receiving surface 22A side), a desired captured image in focus is obtained. The zoom tracking curve T1 has the same starting point on the WIDE side as the zoom tracking curve U, and the zoom tracking curve T2 has the same starting point on the WIDE side as the zoom tracking curve L.

Figure 10:
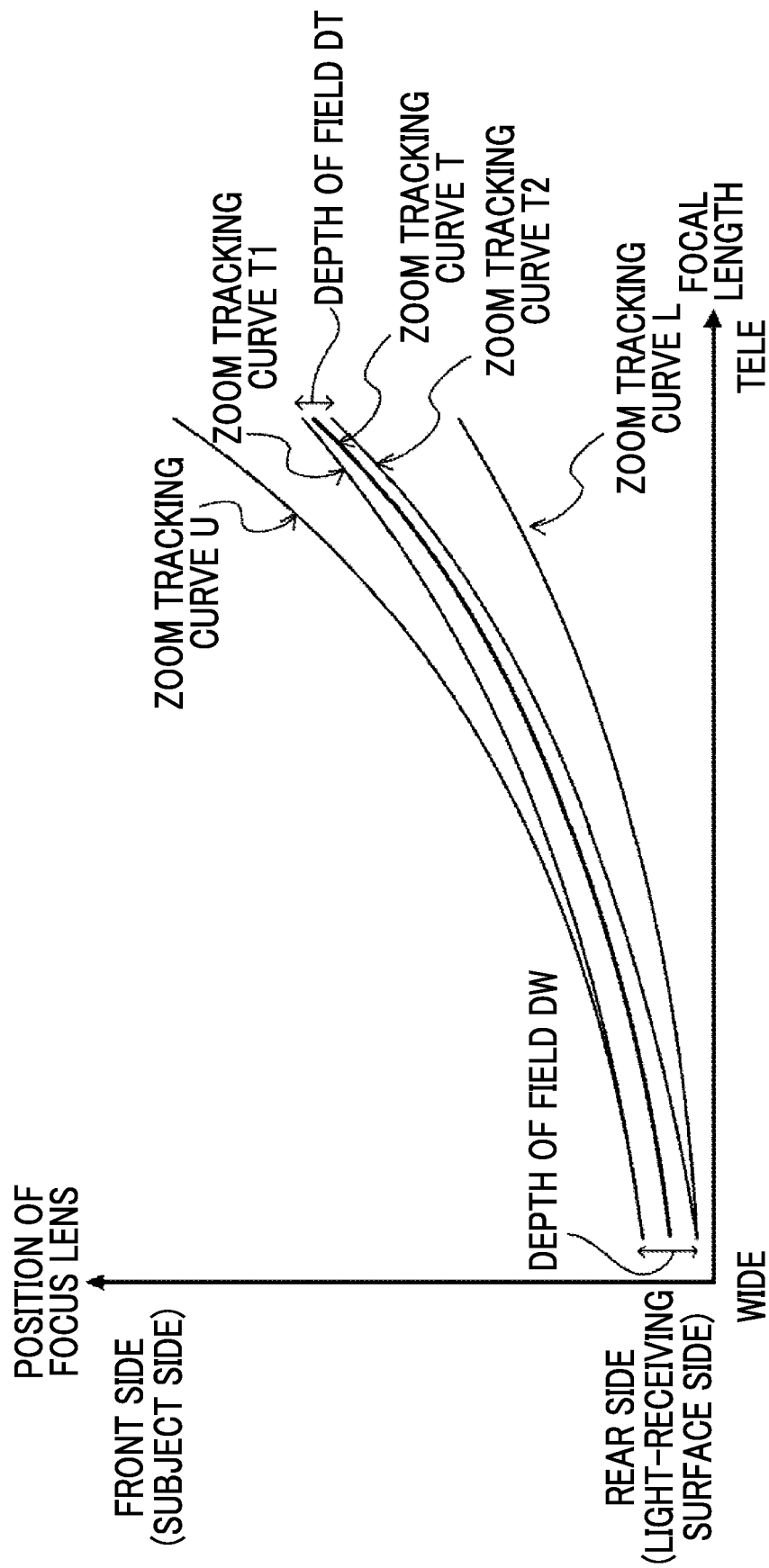
FIG. 10 is a graph for describing zoom tracking control according to the first and second exemplary embodiments.

Since the depth of field becomes shallower as the focal length is increased, as shown in FIG. 10, the depth of field DT for the zoom tracking curve T is shallower than the depth of field DW. Therefore, in the zoom tracking operation, in a case where the zoom lens 82 is moved in a direction in which the focal length is changed from the WIDE to the TELE, it becomes easier to deviate from the focusing position as compared with a case where the zoom lens is moved in a direction where the focal length is changed from the TELE to the WIDE.

Thus, in the exemplary embodiment, in a case where the zoom lens 82 is being moved in a direction where the focal length is changed from the WIDE to the TELE, control to change the zoom tracking curve used in the zoom tracking operation to an appropriate zoom tracking curve according to the focus state is appropriately performed. On the other hand, in the exemplary embodiment, in a case where the zoom lens 82 is being moved in a direction where the focal length is changed from the TELE to the WIDE, the change of the zoom tracking curve as described above is not performed.

Therefore, in a case where the zoom lens 82 is not being moved in a direction in which the focal length is changed from the WIDE to the TELE, in other words, in a case where the zoom lens 82 is being moved in a direction in which the focal length is changed from the TELE to the WIDE, the determination in step S102 is negative, and thus the processing proceeds to step S104.

In step S104, the CPU 74 executes a normal zoom tracking operation for causing the focus lens drive unit 90 to move the focus lens 84 to a position based on the zoom tracking curve obtained in step S100, according to the movement of the zoom lens 82, and in a case where the movement of the zoom lens 82 is stopped, the zoom tracking control processing is ended.

On the other hand, in a case where the zoom lens 82 is being moved in a direction in which the focal length is changed from the WIDE to the TELE, the determination in step S102 is affirmative, and thus the processing proceeds to step S106. In step S106, the CPU 74 changes the frame rate, at which the image signals are read from the imaging element 22 to generate the captured image, to the maximum value that the imaging device 10 can have.

In step S108, the CPU 74 acquires the contrast value of the captured image a plurality of times according to the frame rate changed in step S106, while performing the control to move the focus lens 84. In the exemplary embodiment, since the frame rate defining the timing at which the contrast value is acquired is high, it is possible to acquire many contrast values (captured images) as compared with a case where the frame rate is low. Therefore, it is possible to change the zoom tracking curve to a more appropriate zoom tracking curve, and to improve accuracy of the zoom tracking.

In step S110, the CPU 74 determines whether the difference between the contrast value before the start of the zoom tracking in step S100 and the representative value of the contrast values acquired a plurality of times in step S108 is equal to or greater than a predetermined threshold value. The representative value of the contrast values is not particularly limited, but as the representative value, an average value, a mode value, a maximum value, and the like of the contrast values acquired a plurality of times are exemplified.

In a case where the difference in contrast value is equal to or greater than the predetermined threshold value, the determination in step S110 is affirmative, and thus the processing proceeds to step S132. In a case where the difference in contrast value is large, for example, the captured image may become blurred due to the zoom tracking operation or the original captured image may be greatly blurred. In such a case, the acquired contrast value may be an incorrect value. In a case where the acquired contrast value is incorrect, there is a high concern that changing to an appropriate zoom tracking curve is not performed. Therefore, in the exemplary embodiment, the threshold value for determining that the acquired contrast value is likely to be an inaccurate value is set in advance, and in a case where the difference in contrast value is equal to or greater than the predetermined threshold value, the processing proceeds to step S132 without changing the zoom tracking curve. In the exemplary embodiment, it is possible to improve a system for changing the zoom tracking curve by prohibiting the change of the zoom tracking curve in a case where the difference in contrast value is large as described above.

On the other hand, in a case where the difference in contrast value is not equal to or greater than the predetermined threshold value, in other words, in a case where the difference in contrast value is less than the predetermined threshold value, the determination in step S110 is negative, and thus the processing proceeds to step S112.

In step S112, the CPU 74 derives a change state of the contrast value on the basis of the plurality of contrast values acquired in step S108. In the exemplary embodiment, as an example, a contrast curve represented by the plurality of acquired contrast values is derived as the change state of contrast value.

Figure 11:
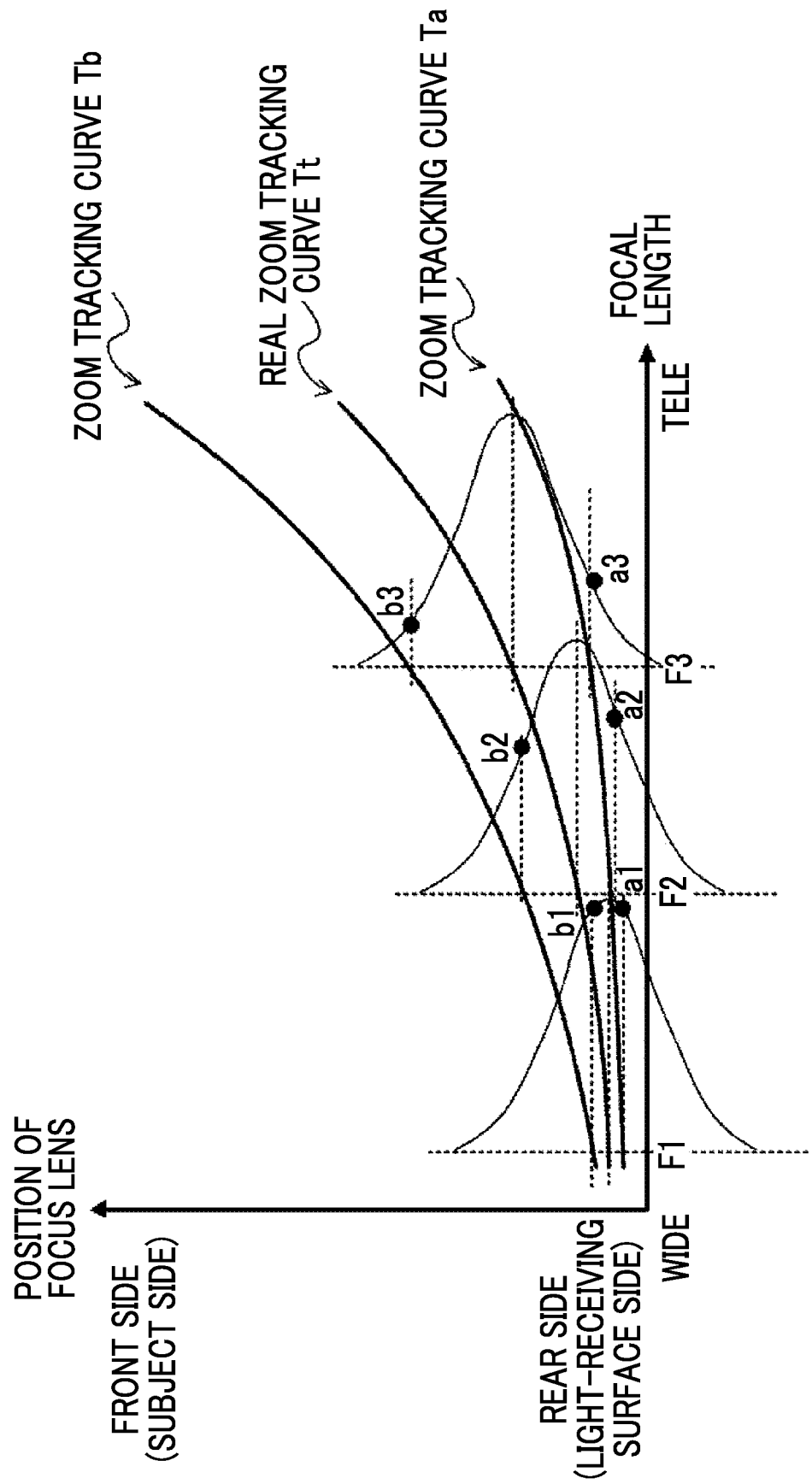
FIG. 11 is a graph for describing an example of a change in contrast value in a zoom tracking control operation according to the first and second exemplary embodiments.
Figure 12:
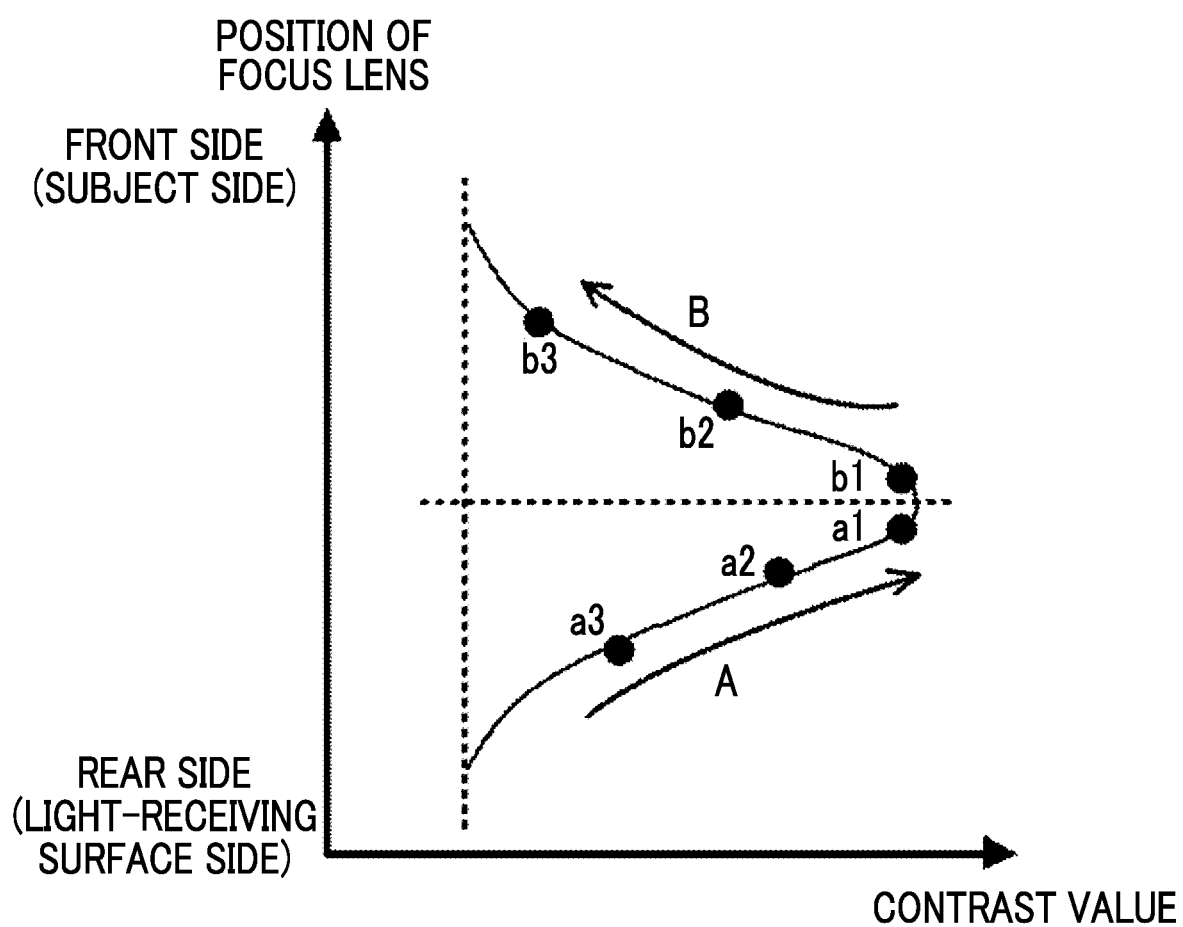
FIG. 12 is a graph for describing an example of a tendency of a change in contrast value in the zoom tracking control operation according to the first and second exemplary embodiments.

As shown in FIG. 11, in a case where a real zoom tracking curve is a zoom tracking curve Tt, it is assumed that the zoom tracking operation is performed using a zoom tracking curve Ta closer to the rear side (light-receiving surface 22A side) than the zoom tracking curve Tt. In this case, as shown in FIG. 11, the contrast values acquired in a case where the focal lengths are F1, F2, and F3 are a1, a2, and a3, respectively. As shown in FIG. 12, when the change state of the contrast value is expressed with the contrast value as the lateral axis (x axis) and the position of the focus lens 84 as the vertical axis (y axis), in a case where the focal length is changed in a direction from the WIDE to the TELE (in case of changing from the focal length F1 to the focal length F3 shown in FIG. 11), the contrast value is increased as the position of the focus lens 84 is changed in a positive direction (to the subject side). In other words, the contrast curve represented by the plurality of acquired contrast values shows an increasing tendency (refer to arrow A of FIG. 12).

The zoom tracking curve shown in FIG. 11 and FIGS. 7 and 10 described above represents the correspondence relationship between the position of the focus lens 84 and the focal length in a case where the position of the focus lens 84 is changed from the rear side (light-receiving surface 22A side) to the front side (subject side) according to the change of the focal length from the WIDE to the TELE, but the correspondence relationship between the focal length and the position of the focus lens 84 varies depending on the focus lens 84 or the zoom lens 82.

Figure 13:
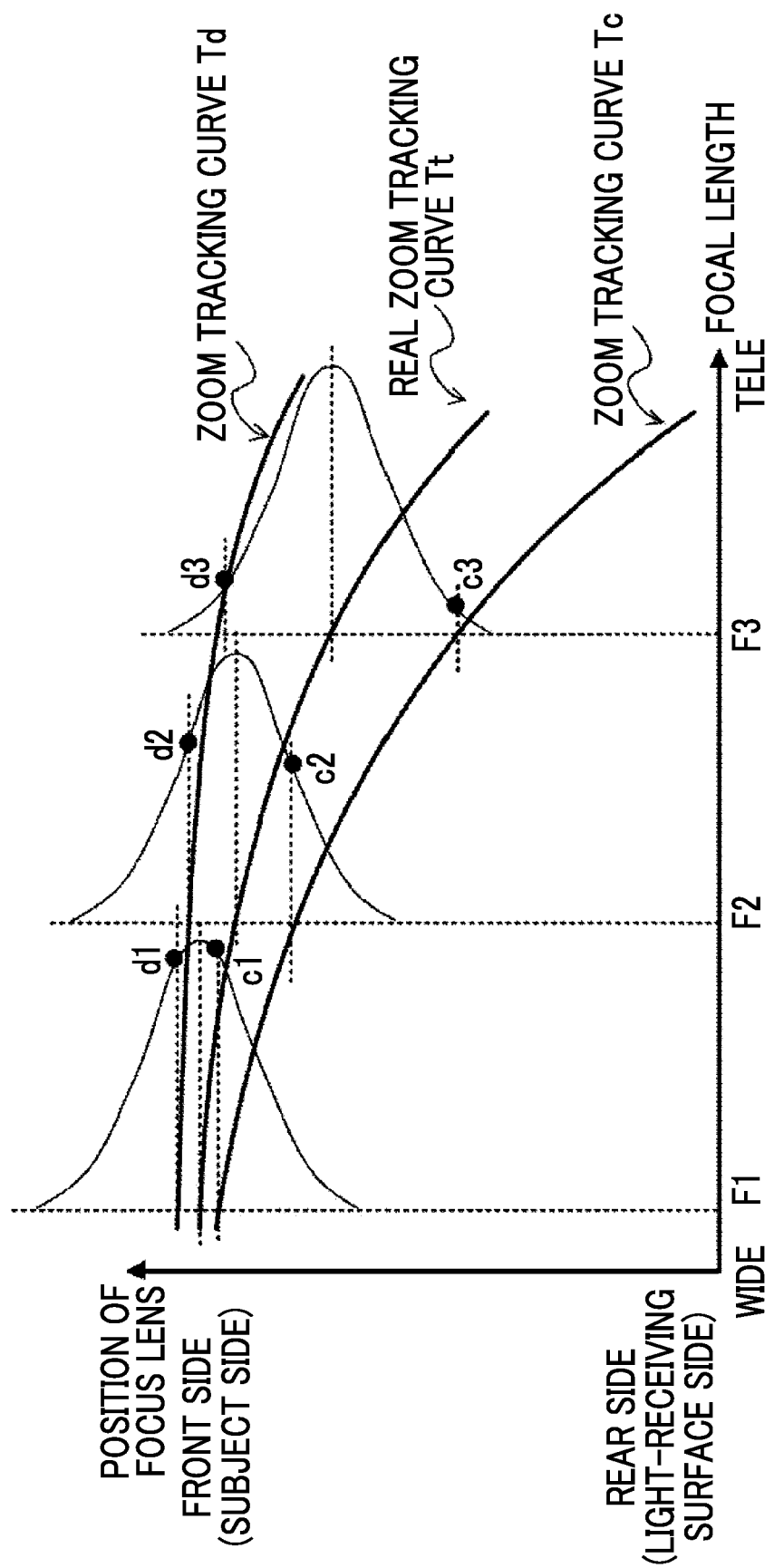
FIG. 13 is a graph for describing another example of a change in contrast value in the zoom tracking control operation according to the first and second exemplary embodiments.

FIG. 13 shows an example of a zoom tracking curve representing a correspondence relationship between the position of the focus lens 84 and the focal length in a case where the position of the focus lens 84 is changed from the front side (subject side) to the rear side (light-receiving surface 22A side) according to the change of the focal length from the WIDE to the TELE.

Figure 14:
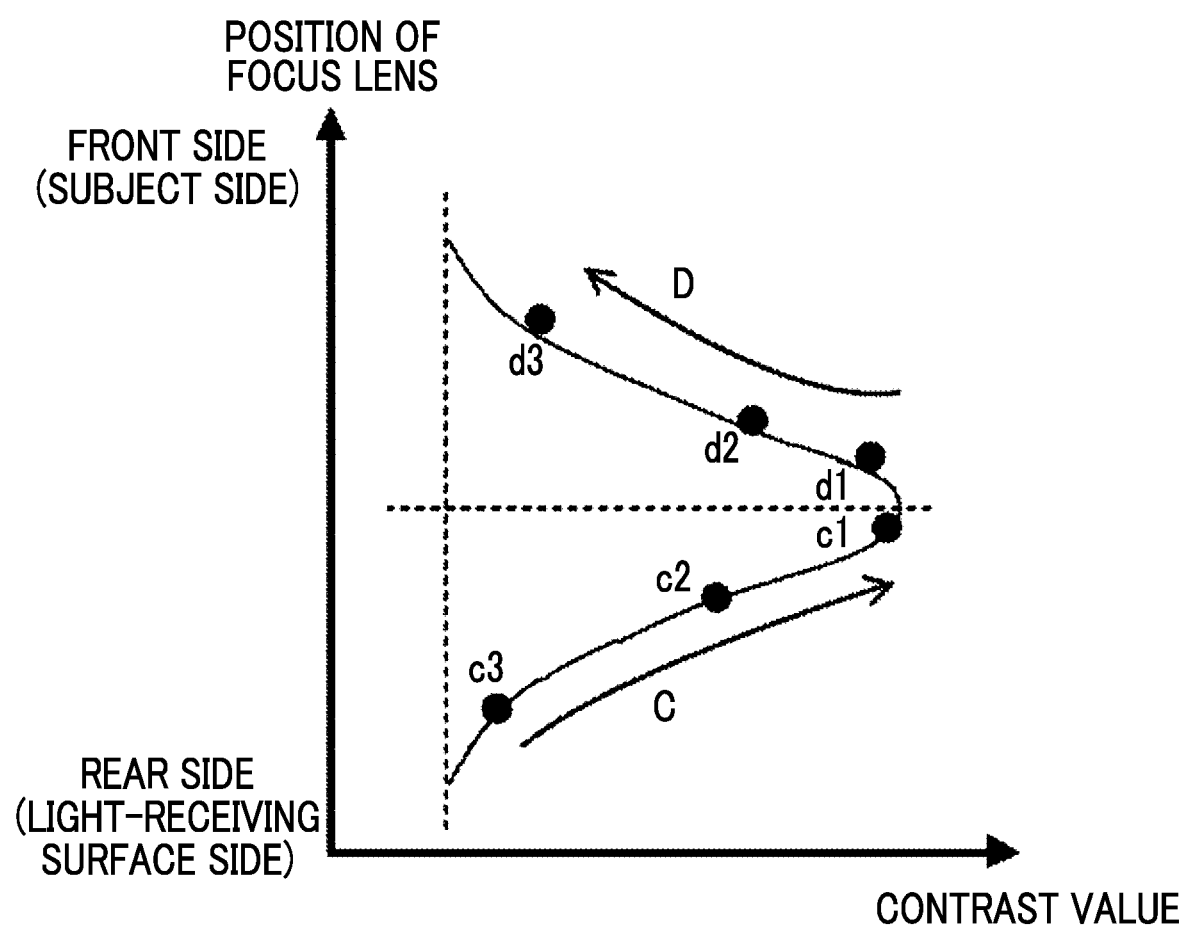
FIG. 14 is a graph for describing another example of a tendency of a change in contrast value in the zoom tracking control operation according to the first and second exemplary embodiments.

Even in the case shown in FIG. 13, in a case where a real zoom tracking curve is a zoom tracking curve Tt, it is assumed that the zoom tracking operation is performed using a zoom tracking curve Tc closer to the rear side (light-receiving surface 22A side) than the zoom tracking curve Tt. In this case, as shown in FIG. 13, the contrast values acquired in a case where the focal lengths are F1, F2, and F3 are c1, c2, and c3, respectively. As shown in FIG. 14, when the change state of the contrast value is expressed with the contrast value as the lateral axis (x axis) and the position of the focus lens 84 as the vertical axis (y axis), in a case where the focal length is changed in a direction from the WIDE to the TELE (in case of changing from the focal length F1 to the focal length F3 shown in FIG. 13), the contrast value is increased as the position of the focus lens 84 is changed in a positive direction (to the subject side). In other words, the contrast curve represented by the plurality of acquired contrast values shows an increasing tendency (refer to arrow C of FIG. 14).

Therefore, in the exemplary embodiment, in a case where the contrast curve represented by the plurality of acquired contrast values show an increasing tendency, control to change the zoom tracking curve to a zoom tracking curve close to the front side (subject side) than the current zoom tracking curve is performed.

On the other hand, as shown in FIG. 11, in a case where a real zoom tracking curve is a zoom tracking curve Tt, it is assumed that the zoom tracking operation is performed using a zoom tracking curve Tb closer to the front side (subject side) than the zoom tracking curve Tt. In this case, as shown in FIG. 11, the contrast values acquired in a case where the focal lengths are F1, F2, and F3 are b1, b2, and b3, respectively. As shown in FIG. 12, when the change state of the contrast value is expressed with the contrast value as the lateral axis (x axis) and the position of the focus lens 84 as the vertical axis (y axis), in a case where the focal length is changed in a direction from the WIDE to the TELE (in case of changing from the focal length F1 to the focal length F3 shown in FIG. 11), the contrast value is decreased as the position of the focus lens 84 is changed in a positive direction (to the subject side). In other words, the contrast curve represented by the plurality of acquired contrast values show a decreasing tendency (refer to arrow B of FIG. 12).

Further, as shown in FIG. 13, in a case where a real zoom tracking curve is a zoom tracking curve Tt, it is assumed that the zoom tracking operation is performed using a zoom tracking curve Td closer to the front side (subject side) than the zoom tracking curve Tt. In this case, as shown in FIG. 13, the contrast values acquired in a case where the focal lengths are F1, F2, and F3 are d1, d2, and d3, respectively. As shown in FIG. 14, when the change state of the contrast value is expressed with the contrast value as the lateral axis (x axis) and the position of the focus lens 84 as the vertical axis (y axis), in a case where the focal length is changed in a direction from the WIDE to the TELE (in case of changing from the focal length F1 to the focal length F3 shown in FIG. 13), the contrast value is decreased as the position of the focus lens 84 is changed in a positive direction (to the subject side). In other words, the contrast curve represented by the plurality of acquired contrast values shows a decreasing tendency (refer to arrow D of FIG. 14).

Therefore, in the exemplary embodiment, in a case where the contrast curve represented by the plurality of acquired contrast values shows a decreasing tendency, control to change the zoom tracking curve to a zoom tracking curve close to the rear side (light-receiving surface 22A side) than the current zoom tracking curve is performed.

Further, in the exemplary embodiment, unlike the case described above, in a case where the plurality of contrast values obtained in step S108 include a peak value, control to change the zoom tracking curve to a zoom tracking curve according to the focus state is performed by changing to a zoom tracking curve corresponding to the peak value.

In step S114, the CPU 74 determines whether a peak value is included in the contrast values obtained in step S108. In a case where a peak value is included in the obtained contrast values, the determination in step S114 is affirmative, and thus the processing proceeds to step S116.

In step S116, the CPU 74 decides the zoom tracking curve corresponding to the peak value as the target zoom tracking curve.

On the other hand, in a case where a peak value is not included in the contrast values obtained in step S108, the determination in step S114 is negative, and thus the processing proceeds to step S118.

In step S118, the CPU 74 determines whether the contrast curve represented by the plurality of contrast values, which is derived in step S112, shows an increasing tendency. In a case where the contrast curve shows an increasing tendency, the determination in step S118 is affirmative, and thus the processing proceeds to step S120. In step S120, the CPU 74 decides a zoom tracking curve on the front side (subject side) as described above, as the target zoom tracking curve. In the exemplary embodiment, it is possible to change the zoom tracking curve while the subject is in focus, by deciding a zoom tracking curve on the front side by the depth of field.

On the other hand, in a case where the contrast curve does not show an increasing tendency, the determination in step S116 is negative, and thus the processing proceeds to step S122.

In step S122, the CPU 74 determines whether the contrast curve represented by the plurality of contrast values, which is derived in step S112, shows a decreasing tendency. In a case where the contrast curve shows a decreasing tendency, the determination in step S122 is affirmative, and thus the processing proceeds to step S124. In step S124, the CPU 74 decides a zoom tracking curve on the rear side (light-receiving surface 22A side) as described above, as the target zoom tracking curve. In the exemplary embodiment, it is possible to change the zoom tracking curve while the subject is in focus, by deciding a zoom tracking curve on the rear side by the depth of field.

On the other hand, in a case where the contrast curve does not show a decreasing tendency, the determination in step S122 is negative, and thus the processing proceeds to step S132.

In step S126 subsequent to steps S116, S120, and S124, the CPU 74 determines whether the target zoom tracking curve decided in any of steps S116, S120, and S124 is within a predetermined range. For example, in the exemplary embodiment, the predetermined range is set to a range between the zoom tracking curve U and the zoom tracking curve L, which is the allowable range of blurriness occurring in the captured image as described above with reference to FIG. 10.

In a case where the target zoom tracking curve is within the predetermined range, the determination in step S126 is affirmative, and thus the processing proceeds to step S128. In step S128, the CPU 74 changes the zoom tracking curve used in the zoom tracking operation to the target zoom tracking curve decided in any of steps S116, S120, and S124.

On the other hand, in a case where the target zoom tracking curve is out of the predetermined range, the determination in step S126 is negative, and thus the processing proceeds to step S130. In step S130, the CPU 74 changes the zoom tracking curve used in the zoom tracking operation to a zoom tracking curve within the predetermined range. In this case, in a case where the zoom tracking curve corresponding to the peak value is decided as the target zoom tracking curve in step S116, the zoom tracking curve is changed to a zoom tracking curve which is within the predetermined range and is closest to the decided zoom tracking curve. Further, in a case where the zoom tracking curve on the front side (subject side) is decided as the target zoom tracking curve in step S120, the zoom tracking curve is changed to a zoom tracking curve which is within the predetermined range and is closer to the front side (subject side) than the current zoom tracking curve used in the zoom tracking operation. Further, in a case where the zoom tracking curve on the rear side (light-receiving surface 22A side) is decided as the target zoom tracking curve in step S124, the zoom tracking curve is changed to a zoom tracking curve which is within the predetermined range and is closer to the rear side (light-receiving surface 22A side) than the current zoom tracking curve used in the zoom tracking operation.

In step S132, the CPU 74 determines whether the operation for moving the zoom lens 82 is ended. In the exemplary embodiment, until the movement of the zoom lens 82 is stopped, the determination in step S132 is negative, the processing returns to step S108, and the processing of steps S110 to S130 is repeated. On the other hand, in a case where the movement of the zoom lens 82 is stopped, the determination in step S132 is affirmative, and thus the processing proceeds to step S134.

In step S134, the CPU 74 stops the zoom tracking operation. In step S136, the CPU 74 returns the frame rate, at which the image signals are read from the imaging element 22 and which is changed to the maximum value in step S106, to a value before the change (for example, frame rate used in normal imaging), and then ends the zoom tracking control processing.

In the imaging device 10 in the exemplary embodiment, the zoom tracking curve used in the zoom tracking operation is changed to a zoom tracking curve decided on the basis of the change of contrast values of the captured image which are acquired a plurality of times. In this manner, in the imaging device 10 in the exemplary embodiment, it is possible to change the zoom tracking curve to an appropriate zoom tracking curve and there is no significant deviation from the focusing position. Accordingly, with the imaging device 10 in the exemplary embodiment, it is possible to improve accuracy of zoom tracking while suppressing deterioration of appearance of a captured image.

Second Exemplary Embodiment

Hereinafter, a second exemplary embodiment will be described in detail. In the exemplary embodiment, the same reference numerals are given to the same configurations and operations as the configurations and operations described in the first exemplary embodiment, and the detailed description thereof is omitted.

Since the configuration of the imaging device 10 of the exemplary embodiment is the same as the configuration of the imaging device 10 of the first exemplary embodiment (refer to FIGS. 1 to 4), the description thereof is omitted.

Figure 15:
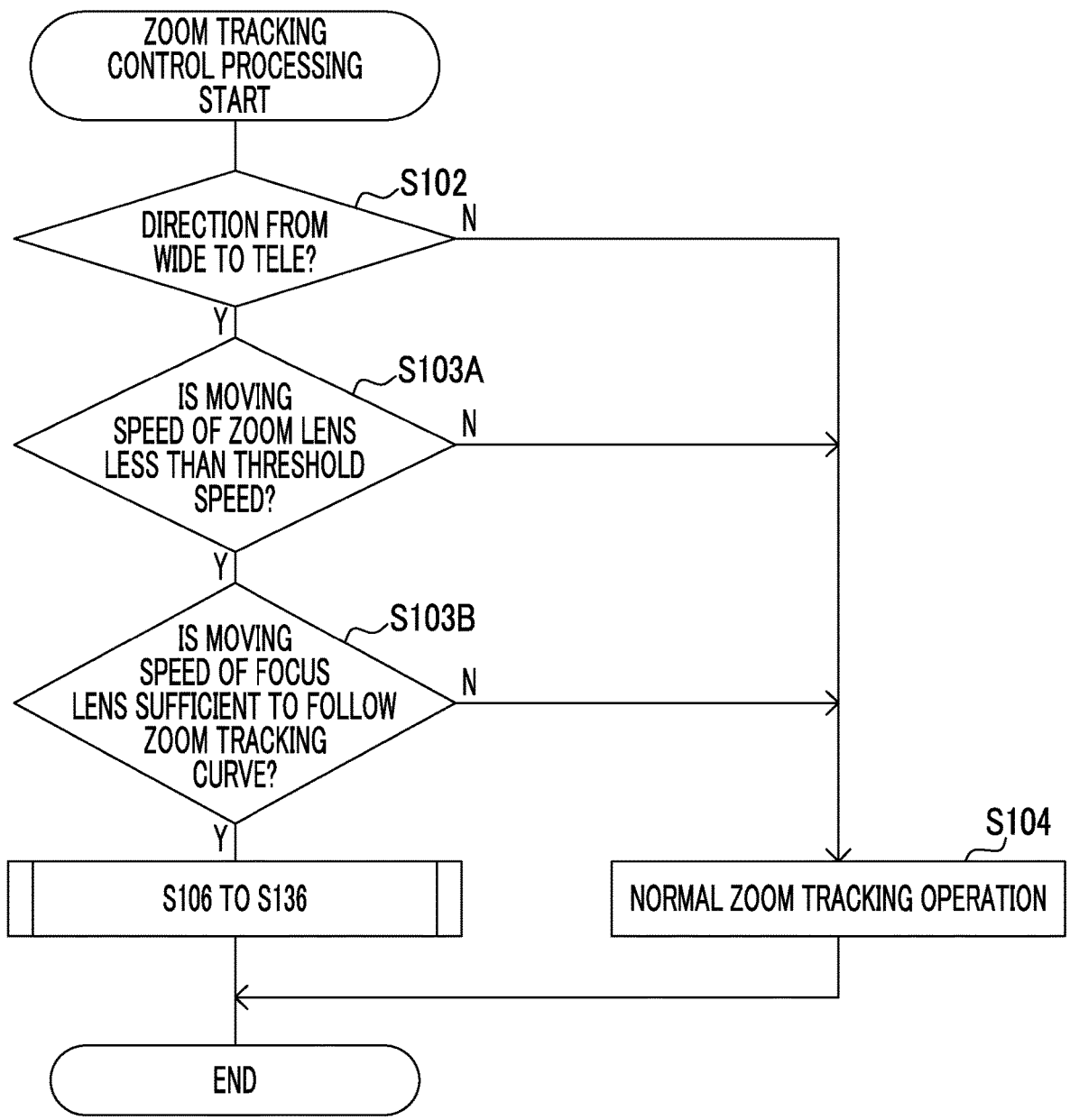
FIG. 15 is a flowchart showing an example of the flow of zoom tracking control processing according to the second exemplary embodiment.

Meanwhile, the operation of the imaging device 10 of the exemplary embodiment differs in part of the zoom tracking control processing. FIG. 15 shows a flowchart showing an example of the flow of the zoom tracking control processing according to the second exemplary embodiment. As shown in FIG. 15, the zoom tracking control processing of the exemplary embodiment is different from the zoom tracking control processing (refer to FIG. 9) of the first exemplary embodiment in that processing of steps S103A and S103B is executed after the determination in step S100 is affirmative.

As shown in FIG. 15, in step S103A, the CPU 74 determines whether the speed at which the zoom lens 82 is moved is less than a predetermined threshold speed. In a case where the moving speed of the zoom lens 82 is too high, in acquisition of the contrast value in step S108 (refer to FIG. 9) described in the first exemplary embodiment, an accurate contrast value may not be acquired in some cases, and thus an appropriate zoom tracking curve may not be decided as the target zoom tracking curve. Therefore, in the exemplary embodiment, the threshold value of the moving speed of the zoom lens 82 at which an appropriate zoom tracking curve can be decided as the target zoom tracking curve is obtained in advance, and is set in the imaging device 10.

In a case where the speed at which the zoom lens 82 is moved is not less than the predetermined threshold speed, in other words, in a case where the speed at which the zoom lens 82 is moved is equal to or greater than the predetermined threshold value, the determination in step S103A is negative, and thus the processing proceeds to step S104. As described above, in step S104, the normal zoom tracking operation is executed, and in a case where the movement of the zoom lens 82 is stopped, the zoom tracking control processing is ended.

On the other hand, in a case where the speed at which the zoom lens 82 is moved is less than the predetermined threshold speed, the determination in step S103A is affirmative, and thus the processing proceeds to step S103B.

In step S103B, the CPU 74 determines whether the moving speed of the focus lens 84 is a speed sufficient to follow the zoom tracking curve. In a case where the moving speed of the focus lens 84 is low, the focus lens 84 may not follow the decided zoom tracking curve, and thus the focusing position may deviate. Therefore, in the exemplary embodiment, the moving speed of the focus lens 84 sufficient to follow the zoom tracking curve is obtained in advance as the threshold value, and is set in the imaging device 10. In a case where the moving speed of the focus lens 84 is lower than the set threshold value, the CPU 74 determines that the moving speed of the focus lens 84 is not a speed sufficient to follow the zoom tracking curve.

In a case where the moving speed of the focus lens 84 is not a speed sufficient to follow the zoom tracking curve, the determination in step S103B is negative, and thus the processing proceeds to step S104.

On the other hand, in a case where the moving speed of the focus lens 84 is a speed sufficient to follow the zoom tracking curve, the determination in step S103B is affirmative, and the processing of steps S106 to S136 (refer to FIG. 9) described in the first exemplary embodiment is executed.

In this manner, in a case where the moving speed of the zoom lens 82 is lower than the moving speed of the zoom lens 82 at which an appropriate zoom tracking curve can be decided as the target zoom tracking curve, the imaging device 10 of the exemplary embodiment performs the normal zoom tracking operation. Further, in a case where the moving speed of the focus lens 84 is not a speed sufficient to follow the zoom tracking curve, the imaging device 10 of the exemplary embodiment performs the normal zoom tracking operation.

In this manner, in the imaging device 10 of the exemplary embodiment, it is possible to change the zoom tracking curve to an appropriate zoom tracking curve, and to improve accuracy of the zoom tracking.

As described above, the imaging device 10 of the exemplary embodiments comprises the imaging lens having the lens unit 18 including the zoom lens 82 and the focus lens 84; the imaging element driver 50 that includes the imaging element 22 and outputs an image signal obtained by imaging a subject through the lens unit 18 by the imaging element 22; the image processing unit 56 that generates a captured image according to the image signal; and the body-side main control unit 46 that includes the CPU 74 and the secondary storage unit 78 storing the zoom tracking control program 79.

The CPU 74 executes the zoom tracking control program 79 to function as the acquisition unit that acquires the focal length of the imaging lens from the state of the zoom lens 82, and the control unit that performs the zoom tracking operation by first control of performing control to change the position of the focus lens 84 along the optical axis direction according to the acquired focal length on the basis of the zoom tracking curve represented by the tracking data 110 representing a correspondence relationship between the focal length and the focus position according to the subject distance, and second control of acquiring contrast information representing contrast of the captured image a plurality of times during execution of the first control and performing control to change the zoom tracking curve used in the first control on the basis of a change of contrast values represented by a plurality of pieces of the acquired contrast information.

Accordingly, in the imaging device 10 of the exemplary embodiments, it is possible to change the zoom tracking curve to an appropriate zoom tracking curve and there is no significant deviation from the focusing position. Therefore, with the imaging device 10 of the exemplary embodiment, it is possible to improve accuracy of zoom tracking while suppressing deterioration of appearance of a captured image.

In the exemplary embodiments, an aspect in which the normal zoom tracking operation is performed in a case where the zoom lens 82 is being moved in a direction in which the focal length is changed from the TELE to the WIDE has been described, but the technique of the present disclosure is not limited to the aspect. Since there is a concern that the deviation from the focusing position occurs even in a case where the zoom lens 82 is being moved in a direction in which the focal length is changed from the TELE to the WIDE, control to change the zoom tracking curve may be performed similarly to the case where the zoom lens 82 is being moved in a direction in which the focal length is changed from the WIDE to the TELE.

Figure 16:
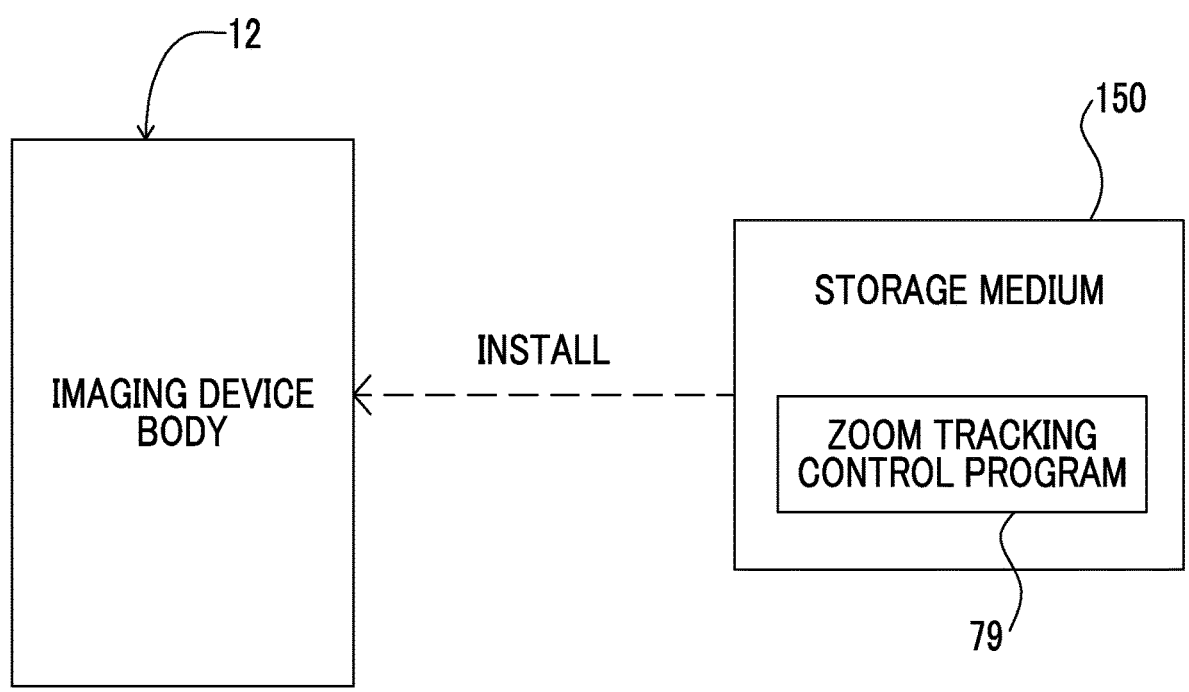
FIG. 16 is a conceptual diagram showing an example of an aspect in which a zoom tracking control program is installed in an imaging device body from a storage medium in which the zoom tracking control according to the exemplary embodiment is stored.

In the exemplary embodiments, a case where the zoom tracking control program 79 is read from the secondary storage unit 78 has been exemplified, but it is not necessary to store the zoom tracking control program 79 in the secondary storage unit 78 from the beginning. For example, as shown in FIG. 16, the zoom tracking control program 79 may be stored in advance in any portable storage medium 150 such as a solid state drive (SSD), a Universal Serial Bus (USB) memory, or a compact disc read only memory (CD-ROM). In this case, the zoom tracking control program 79 of the storage medium 150 is installed on the imaging device body 12, and the installed zoom tracking control program 79 is executed by the CPU 74.

Moreover, the zoom tracking control program 79 may be stored in storage units of other computers or server devices connected to the imaging device body 12 through a communication network (not shown), and may the zoom tracking control program 79 may be downloaded in response to the request of the imaging device body 12. In this case, the downloaded zoom tracking control program 79 is executed by the CPU 74.

Further, the zoom tracking control processing described in the exemplary embodiments is merely an example. Accordingly, it goes without saying that unnecessary steps may be deleted, new steps may be added, or the sequence of the processing may be changed within a range not departing from the scope of the disclosure.

Furthermore, in the exemplary embodiments, a case where the zoom tracking control processing is realized by the software configuration using a computer has been exemplified, but the technique of the present disclosure is not limited thereto. For example, the zoom tracking control processing may be executed only by the hardware configuration such as a field-programmable gate array (FPGA) or an application specific integrated circuit (ASIC), instead of the software configuration using a computer. Further, the zoom tracking control processing may be executed by a configuration in which the software configuration and the hardware configuration are combined.

All documents, patent applications, and technical standards disclosed in this specification are incorporated in this specification by reference to the same extent as if the documents, the patent applications, and the technical standards were specifically and individually stated to be incorporated by reference.

The disclosure of JP 2017-188602 is incorporated in this specification by reference in its entirety.

What is claimed is:

1. An imaging device comprising:
an imaging lens having an imaging optical system including a zoom lens and a focus lens;
an imager that outputs an image signal obtained by imaging a subject through the imaging optical system; and
a processor, the processor configured to:
generate a captured image according to the image signal;
acquire a focal length of the imaging lens from a state of the zoom lens;
perform first control to change a position of the focus lens along an optical axis direction according to the focal length on the basis of zoom tracking information representing a correspondence relationship between the focal length and a focus position according to a subject distance; and
perform second control to acquire contrast information representing contrast of the captured image a plurality of times during execution of the first control and change the zoom tracking information used in the first control on the basis of a change of contrast values represented by a plurality of pieces of the acquired contrast information,
wherein, in a case where a difference between the contrast value represented by the contrast information before execution of the first control and the contrast value represented by the contrast information after execution of the first control is equal to or greater than a predetermined threshold value, the processor prohibits execution of the second control.

2. The imaging device according to claim 1, wherein the zoom tracking information is a zoom tracking curve representing the correspondence relationship between the focal length and the focus position.

3. The imaging device according to claim 2, wherein the second control is control to change the zoom tracking curve used in the first control to a zoom tracking curve on a front side which is shifted by a depth of field or a zoom tracking curve on a rear side which is shifted by the depth of field.

4. The imaging device according to claim 2, wherein in a case where the contrast values represented by the plurality of pieces of contrast information include a peak value of the contrast value, the second control is control to change the zoom tracking curve to a zoom tracking curve according to the peak value.

5. The imaging device according to claim 3, wherein in a case where a contrast curve represented by the contrast values represented by the plurality of pieces of contrast information shows an increasing tendency, the second control is control to change the zoom tracking curve to the zoom tracking curve on the front side which is shifted by the depth of field.

6. The imaging device according to claim 3, wherein in a case where a contrast curve represented by the contrast values represented by the plurality of pieces of contrast information shows a decreasing tendency, the second control is control to change the zoom tracking curve to the zoom tracking curve on the rear side which is shifted by the depth of field.

7. The imaging device according to claim 2, wherein the second control is control to change the zoom tracking curve used in the first control to another zoom tracking curve which is in a predetermined range from the zoom tracking curve before change.

8. The imaging device according to claim 7, wherein the predetermined range is a range according to a depth of field according to the zoom tracking curve before change.

9. The imaging device according to claim 2, wherein in a case where a change speed of the position of the focus lens which is changed in the first control is lower than a predetermined speed, the processor prohibits execution of the second control.

10. The imaging device according to claim 9, wherein the predetermined speed is a speed at which the change of the position of the focus lens is not able to follow the zoom tracking curve.

11. The imaging device according to claim 1, wherein in a case where a change speed at which the focal length is changed is less than a predetermined change speed, the processor performs the second control.

12. The imaging device according to claim 1, wherein the processor further performs control to increase a frame rate at which the image signal is output during an operation of acquiring the contrast information, as compare with other cases.

13. The imaging device according to claim 1, wherein the processor performs the second control in a case where the focal length is changed from a wide angle side to a telephoto side by the movement of the zoom lens, and prohibits the second control in a case where the focal length is changed from the telephoto side to the wide angle side.

14. A control method of an imaging device comprising an imaging lens having an imaging optical system including a zoom lens and a focus lens, an imaging unit that includes an imager and outputs an image signal obtained by imaging a subject through the imaging optical system by the imager, an image generation unit that generates a captured image according to the image signal, and an acquisition unit that acquires a focal length of the imaging lens from a state of the zoom lens, the control method comprising:

performing first control to change a position of the focus lens along an optical axis direction according to the focal length acquired by the acquisition unit on the basis of zoom tracking information representing a correspondence relationship between the focal length and a focus position according to a subject distance; and performing second control to acquire contrast information representing contrast of the captured image a plurality of times during execution of the first control and to change the zoom tracking information used in the first control on the basis of a change of contrast values represented by a plurality of pieces of the acquired contrast information wherein, in a case where a difference between the contrast value represented by the contrast information before execution of the first control and the contrast value represented by the contrast information after execution of the first control is equal to or greater than a predetermined threshold value, prohibiting execution of the second control.

15. A non-transitory computer readable medium storing a control program of an imaging device comprising an imaging lens having an imaging optical system including a zoom lens and a focus lens, an imaging unit that includes an imager and outputs an image signal obtained by imaging a subject through the imaging optical system by the imager, an image generation unit that generates a captured image according to the image signal, and an acquisition unit that acquires a focal length of the imaging lens from a state of the zoom lens, the control program causing a computer to execute a process comprising:

performing first control to change a position of the focus lens along an optical axis direction according to the focal length acquired by the acquisition unit on the basis of zoom tracking information representing a correspondence relationship between the focal length and a focus position according to a subject distance; and performing second control to acquire contrast information representing contrast of the captured image a plurality of times during execution of the first control and to change the zoom tracking information used in the first control on the basis of a change of contrast values represented by a plurality of pieces of the acquired contrast information wherein, in a case where a difference between the contrast value represented by the contrast information before execution of the first control and the contrast value represented by the contrast information after execution of the first control is equal to or greater than a predetermined threshold value, prohibiting execution of the second control.

* * * * *